(12) United States Patent
Vallala et al.

(10) Patent No.: US 11,392,363 B2
(45) Date of Patent: Jul. 19, 2022

(54) IMPLEMENTING APPLICATION ENTRYPOINTS WITH CONTAINERS OF A BUNDLED APPLICATION

(71) Applicant: Robin Systems, Inc., San Jose, CA (US)

(72) Inventors: Shravan Kumar Vallala, San Jose, CA (US); Ravi Kumar Alluboyina, Santa Clara, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 360 days.

(21) Appl. No.: 15/868,740

(22) Filed: Jan. 11, 2018

(65) Prior Publication Data
US 2019/0212998 A1    Jul. 11, 2019

(51) Int. Cl.
| | |
|---|---|
| G06F 8/65 | (2018.01) |
| G06F 9/445 | (2018.01) |
| G06F 8/60 | (2018.01) |
| G06F 11/14 | (2006.01) |
| G06F 9/455 | (2018.01) |
| H04L 45/74 | (2022.01) |

(Continued)

(52) U.S. Cl.
CPC .................. *G06F 8/65* (2013.01); *G06F 8/60* (2013.01); *G06F 9/445* (2013.01); *G06F 9/45558* (2013.01); *G06F 11/1464* (2013.01); *G06F 11/1469* (2013.01); *G06F 2201/84* (2013.01); *H04L 45/74* (2013.01); *H04L 49/70* (2013.01); *H04L 67/10* (2013.01); *H04L 67/1097* (2013.01)

(58) Field of Classification Search
CPC ..... H04L 67/1097; H04L 67/10; H04L 49/70; H04L 45/74; G06F 2201/84; G06F 11/1469; G06F 11/1464; G06F 9/45558; G06F 9/445; G06F 8/60; G06F 8/65
See application file for complete search history.

(56) References Cited

U.S. PATENT DOCUMENTS

| | | |
|---|---|---|
| 3,715,573 A | 2/1973 | Vogelsberg |
| 4,310,883 A | 1/1982 | Clifton |

(Continued)

FOREIGN PATENT DOCUMENTS

| | | |
|---|---|---|
| WO | WO2017008675 | 1/2017 |

OTHER PUBLICATIONS

Segment map.

(Continued)

*Primary Examiner* — Phillip H Nguyen
(74) *Attorney, Agent, or Firm* — David R. Stevens; Stevens Law Group

(57) ABSTRACT

Snapshots of storage volumes and containers of a bundled application may be created and used to rollback or clone the bundled application. Clone snapshots of storage volumes may be gradually populated with data from prior snapshots to reduce loading on a primary snapshot. Components of cloned applications may communicate with one another using addresses of these components in the parent application. Containers of the bundled application may communicate with an open virtual switch (OVS) that implements flows to implement translation between clone and parent addresses. Containers may be modified to execute operation-specific entrypoint functions prior to invoking an entrypoint of an application instance loaded in the containers.

18 Claims, 27 Drawing Sheets

(51) Int. Cl.
    *H04L 49/00* (2022.01)
    *H04L 67/10* (2022.01)
    *H04L 67/1097* (2022.01)

(56) References Cited

U.S. PATENT DOCUMENTS

| | | | |
|---|---|---|---|
| 5,602,993 A | 2/1997 | Stromberg | |
| 5,680,513 A | 10/1997 | Hyland | |
| 5,796,290 A | 8/1998 | Takahashi | |
| 6,014,669 A | 1/2000 | Slaughter | |
| 6,052,797 A | 4/2000 | Ofek | |
| 6,119,214 A | 9/2000 | Dirks | |
| 6,157,963 A | 12/2000 | Courtright, II | |
| 6,161,191 A | 12/2000 | Slaughter | |
| 6,298,478 B1 | 10/2001 | Nally | |
| 6,301,707 B1 | 10/2001 | Carroll | |
| 6,311,193 B1 | 10/2001 | Sekido | |
| 6,851,034 B2 | 2/2005 | Challenger | |
| 6,886,160 B1 | 4/2005 | Lee | |
| 6,895,485 B1 | 5/2005 | Dekoning | |
| 6,957,221 B1 | 10/2005 | Hart | |
| 7,096,465 B1 | 8/2006 | Dardinski | |
| 7,111,055 B2 | 9/2006 | Falkner | |
| 7,171,659 B2 | 1/2007 | Becker | |
| 7,246,351 B2 | 7/2007 | Bloch | |
| 7,305,671 B2 | 12/2007 | Davidov | |
| 7,461,374 B1 | 12/2008 | Balint | |
| 7,467,268 B2 | 12/2008 | Lindemann | |
| 7,535,854 B2 | 5/2009 | Luo | |
| 7,590,620 B1 | 9/2009 | Pike | |
| 7,698,698 B2 | 4/2010 | Skan | |
| 7,721,283 B2 | 5/2010 | Kovachka | |
| 7,734,859 B2 | 6/2010 | Daniel | |
| 7,738,457 B2 * | 6/2010 | Nordmark | H04L 45/00 370/392 |
| 7,779,091 B2 | 8/2010 | Wilkinson | |
| 7,797,693 B1 | 9/2010 | Gustafson | |
| 7,984,485 B1 | 7/2011 | Rao | |
| 8,037,471 B2 | 10/2011 | Keller | |
| 8,046,450 B1 | 10/2011 | Schloss | |
| 8,060,522 B2 | 11/2011 | Birdwell | |
| 8,121,874 B1 | 2/2012 | Guheen | |
| 8,171,141 B1 | 5/2012 | Offer | |
| 8,219,821 B2 | 7/2012 | Zimmels | |
| 8,250,033 B1 | 8/2012 | De Souter | |
| 8,261,295 B1 | 9/2012 | Risbood | |
| 8,326,883 B2 | 12/2012 | Pizzorni | |
| 8,392,498 B2 | 3/2013 | Berg | |
| 8,429,346 B1 | 4/2013 | Chen | |
| 8,464,241 B2 | 6/2013 | Hayton | |
| 8,505,003 B2 | 8/2013 | Bowen | |
| 8,527,544 B1 | 9/2013 | Colgrove | |
| 8,589,447 B1 | 11/2013 | Grunwald et al. | |
| 8,601,467 B2 | 12/2013 | Hofhansl | |
| 8,620,973 B1 | 12/2013 | Veeraswamy | |
| 8,666,933 B2 | 3/2014 | Pizzorni | |
| 8,745,003 B1 | 6/2014 | Patterson | |
| 8,775,751 B1 | 7/2014 | Pendharkar | |
| 8,782,632 B1 * | 7/2014 | Chigurapati | G06F 8/65 717/172 |
| 8,788,634 B2 | 7/2014 | Krig | |
| 8,832,324 B1 | 9/2014 | Hodges | |
| 8,886,806 B2 | 11/2014 | Tung | |
| 8,909,885 B2 | 12/2014 | Corbett | |
| 8,954,383 B1 | 2/2015 | Vempati | |
| 8,954,568 B2 | 2/2015 | Krishnan | |
| 8,966,198 B1 | 2/2015 | Harris | |
| 9,009,542 B1 | 4/2015 | Marr | |
| 9,134,992 B2 | 9/2015 | Wong | |
| 9,146,769 B1 | 9/2015 | Shankar | |
| 9,148,465 B2 | 9/2015 | Gambardella | |
| 9,152,337 B2 | 10/2015 | Kono | |
| 9,167,028 B1 * | 10/2015 | Bansal | H04L 41/5038 |
| 9,280,591 B1 | 3/2016 | Kharatishvili | |
| 9,330,155 B1 | 5/2016 | Bono | |
| 9,336,060 B2 | 5/2016 | Nori | |
| 9,342,444 B2 | 5/2016 | Minckler | |
| 9,367,301 B1 | 6/2016 | Serrano | |
| 9,390,128 B1 | 7/2016 | Seetala | |
| 9,436,693 B1 | 9/2016 | Lockhart | |
| 9,514,160 B2 | 12/2016 | Song | |
| 9,521,198 B1 | 12/2016 | Agarwala | |
| 9,569,274 B2 | 2/2017 | Tarta | |
| 9,569,480 B2 | 2/2017 | Provencher | |
| 9,590,872 B1 | 3/2017 | Jagtap | |
| 9,600,193 B2 | 3/2017 | Ahrens | |
| 9,613,119 B1 | 4/2017 | Aron | |
| 9,619,389 B1 | 4/2017 | Roug | |
| 9,635,132 B1 | 4/2017 | Lin | |
| 9,667,470 B2 | 5/2017 | Prathipati | |
| 9,733,992 B1 | 8/2017 | Poeluev | |
| 9,747,096 B2 | 8/2017 | Searle | |
| 9,870,366 B1 | 1/2018 | Duan | |
| 9,880,933 B1 | 1/2018 | Gupta | |
| 9,892,265 B1 | 2/2018 | Tripathy | |
| 9,929,916 B1 | 3/2018 | Subramanian | |
| 9,998,955 B1 | 6/2018 | MacCarthaigh | |
| 10,019,459 B1 | 7/2018 | Agarwala | |
| 10,042,628 B2 | 8/2018 | Thompson | |
| 10,061,520 B1 | 8/2018 | Zhao | |
| 10,133,619 B1 | 11/2018 | Nagpal | |
| 10,169,169 B1 | 1/2019 | Shaikh | |
| 10,191,778 B1 | 1/2019 | Yang | |
| 10,241,774 B2 | 3/2019 | Spivak | |
| 10,282,229 B2 | 5/2019 | Wagner | |
| 10,339,112 B1 | 7/2019 | Ranade | |
| 10,346,001 B2 | 7/2019 | Greenberg | |
| 10,353,634 B1 | 7/2019 | Greenwood | |
| 10,430,434 B2 | 10/2019 | Sun | |
| 10,564,850 B1 | 2/2020 | Gud | |
| 10,657,119 B1 | 5/2020 | Acheson | |
| 10,705,878 B2 | 7/2020 | Liu | |
| 10,956,246 B1 | 3/2021 | Bagde | |
| 11,082,333 B1 | 8/2021 | Lam | |
| 2002/0141390 A1 | 10/2002 | Fangman | |
| 2003/0126426 A1 | 7/2003 | Frye | |
| 2004/0010716 A1 | 1/2004 | Childress | |
| 2004/0153703 A1 | 8/2004 | Vigue | |
| 2004/0221125 A1 | 11/2004 | Ananthanarayanan | |
| 2005/0065986 A1 | 3/2005 | Bixby | |
| 2005/0216895 A1 * | 9/2005 | Tran | G06F 11/362 717/127 |
| 2005/0256948 A1 | 11/2005 | Hu | |
| 2006/0025908 A1 | 2/2006 | Rachlin | |
| 2006/0053357 A1 | 3/2006 | Rajski | |
| 2006/0085674 A1 | 4/2006 | Ananthamurthy | |
| 2006/0259686 A1 | 11/2006 | Sonobe | |
| 2007/0006015 A1 | 1/2007 | Rao | |
| 2007/0016786 A1 | 1/2007 | Waltermann | |
| 2007/0033356 A1 | 2/2007 | Erlikhman | |
| 2007/0067583 A1 | 3/2007 | Zohar | |
| 2007/0165625 A1 | 7/2007 | Eisner | |
| 2007/0260842 A1 | 11/2007 | Faibish | |
| 2007/0277056 A1 | 11/2007 | Varadarajan | |
| 2007/0288791 A1 | 12/2007 | Allen | |
| 2008/0010421 A1 | 1/2008 | Chen | |
| 2008/0068899 A1 | 3/2008 | Ogihara | |
| 2008/0083012 A1 | 4/2008 | Yu | |
| 2008/0189468 A1 * | 8/2008 | Schmidt | G06F 11/203 711/6 |
| 2008/0235544 A1 | 9/2008 | Lai | |
| 2008/0256141 A1 | 10/2008 | Wayda | |
| 2008/0256143 A1 | 10/2008 | Reddy | |
| 2008/0256167 A1 | 10/2008 | Branson | |
| 2008/0263400 A1 | 10/2008 | Waters | |
| 2008/0270592 A1 | 10/2008 | Choudhary | |
| 2009/0144497 A1 | 6/2009 | Withers | |
| 2009/0172335 A1 | 7/2009 | Kulkarni | |
| 2009/0240809 A1 | 9/2009 | La Frese | |
| 2009/0254701 A1 | 10/2009 | Kurokawa | |
| 2009/0307249 A1 | 12/2009 | Koifman | |
| 2010/0100251 A1 | 4/2010 | Chao | |
| 2010/0161941 A1 | 6/2010 | Vyshetsky | |
| 2010/0162233 A1 | 6/2010 | Ku | |

(56) References Cited

U.S. PATENT DOCUMENTS

| | | |
|---|---|---|
| 2010/0211815 A1 | 8/2010 | Mankovskii |
| 2010/0274984 A1 | 10/2010 | Inomata |
| 2010/0299309 A1 | 11/2010 | Maki |
| 2010/0306495 A1 | 12/2010 | Kumano |
| 2010/0332730 A1 | 12/2010 | Royer |
| 2011/0083126 A1 | 4/2011 | Bhakta |
| 2011/0119664 A1 | 5/2011 | Kimura |
| 2011/0161291 A1 | 6/2011 | Taleck |
| 2011/0188506 A1 | 8/2011 | Arribas |
| 2011/0208928 A1 | 8/2011 | Chandra |
| 2011/0239227 A1 | 9/2011 | Schaefer |
| 2011/0246420 A1 | 10/2011 | Wang |
| 2011/0276951 A1 | 11/2011 | Jain |
| 2012/0005557 A1 | 1/2012 | Mardiks |
| 2012/0016845 A1 | 1/2012 | Bates |
| 2012/0066449 A1 | 3/2012 | Colgrove |
| 2012/0102369 A1 | 4/2012 | Hiltunen |
| 2012/0137059 A1 | 5/2012 | Yang |
| 2012/0159519 A1 | 6/2012 | Matsuda |
| 2012/0216052 A1 | 8/2012 | Dunn |
| 2012/0226667 A1 | 9/2012 | Volvovski |
| 2012/0240012 A1 | 9/2012 | Weathers |
| 2012/0259819 A1 | 10/2012 | Patwardhan |
| 2012/0265976 A1 | 10/2012 | Spiers |
| 2012/0303348 A1 | 11/2012 | Lu |
| 2012/0311671 A1 | 12/2012 | Wood |
| 2012/0331113 A1 | 12/2012 | Jain |
| 2013/0054552 A1 | 2/2013 | Hawkins |
| 2013/0054932 A1 | 2/2013 | Acharya |
| 2013/0080723 A1 | 3/2013 | Sawa |
| 2013/0179208 A1 | 7/2013 | Chung |
| 2013/0254521 A1 | 9/2013 | Bealkowski |
| 2013/0282662 A1 | 10/2013 | Kumarasamy |
| 2013/0332688 A1 | 12/2013 | Corbett |
| 2013/0339659 A1 | 12/2013 | Bybell |
| 2013/0346618 A1 | 12/2013 | Holkkola |
| 2013/0346709 A1 | 12/2013 | Wang |
| 2014/0006465 A1 | 1/2014 | Davis |
| 2014/0047263 A1 | 2/2014 | Coatney |
| 2014/0047341 A1* | 2/2014 | Breternitz .............. G06F 9/505 715/735 |
| 2014/0047342 A1 | 2/2014 | Breternitz |
| 2014/0058871 A1 | 2/2014 | Marr |
| 2014/0059527 A1* | 2/2014 | Gagliardi .............. G06F 8/656 717/166 |
| 2014/0059528 A1* | 2/2014 | Gagliardi ........... G06F 11/3644 717/170 |
| 2014/0089265 A1 | 3/2014 | Talagala |
| 2014/0108483 A1 | 4/2014 | Tarta |
| 2014/0130040 A1 | 5/2014 | Lemanski |
| 2014/0149696 A1 | 5/2014 | Frenkel |
| 2014/0181676 A1 | 6/2014 | Samborskyy |
| 2014/0195847 A1 | 7/2014 | Webman |
| 2014/0245319 A1 | 8/2014 | Fellows |
| 2014/0281449 A1 | 9/2014 | Christopher |
| 2014/0282596 A1 | 9/2014 | Bourbonnais |
| 2015/0007171 A1 | 1/2015 | Blake |
| 2015/0019495 A1 | 1/2015 | Siden |
| 2015/0046644 A1 | 2/2015 | Karp |
| 2015/0067031 A1* | 3/2015 | Acharya ............... H04W 4/60 709/203 |
| 2015/0074358 A1 | 3/2015 | Flinsbaugh |
| 2015/0106549 A1 | 4/2015 | Brown |
| 2015/0112951 A1 | 4/2015 | Narayanamurthy et al. |
| 2015/0134857 A1 | 5/2015 | Hahn |
| 2015/0149605 A1 | 5/2015 | De La Iglesia |
| 2015/0186217 A1 | 7/2015 | Eslami Sarab |
| 2015/0278333 A1 | 10/2015 | Hirose |
| 2015/0317212 A1 | 11/2015 | Lee |
| 2015/0319160 A1 | 11/2015 | Ferguson |
| 2015/0326481 A1 | 11/2015 | Rector |
| 2015/0379287 A1 | 12/2015 | Mathur |
| 2016/0011816 A1 | 1/2016 | Aizman |
| 2016/0026667 A1 | 1/2016 | Mukherjee |
| 2016/0042005 A1 | 2/2016 | Liu |
| 2016/0124775 A1 | 5/2016 | Ashtiani |
| 2016/0197995 A1 | 7/2016 | Lu |
| 2016/0239412 A1 | 8/2016 | Wada |
| 2016/0259597 A1 | 9/2016 | Worley |
| 2016/0283261 A1* | 9/2016 | Nakatsu .............. G06F 9/45558 |
| 2016/0357456 A1 | 12/2016 | Iwasaki |
| 2016/0357548 A1* | 12/2016 | Stanton .................. G06F 8/656 |
| 2016/0373327 A1 | 12/2016 | Degioanni |
| 2017/0034023 A1 | 2/2017 | Nickolov |
| 2017/0060710 A1 | 3/2017 | Ramani |
| 2017/0060975 A1 | 3/2017 | Akyureklier |
| 2017/0075749 A1 | 3/2017 | Ambichl |
| 2017/0139645 A1 | 5/2017 | Byun |
| 2017/0149843 A1* | 5/2017 | Amulothu ........... G06F 9/45558 |
| 2017/0168903 A1 | 6/2017 | Dornemann |
| 2017/0192889 A1 | 7/2017 | Sato |
| 2017/0206017 A1 | 7/2017 | Sun |
| 2017/0214550 A1 | 7/2017 | Kumar |
| 2017/0235649 A1 | 8/2017 | Shah |
| 2017/0242617 A1 | 8/2017 | Walsh |
| 2017/0242719 A1 | 8/2017 | Tsirkin |
| 2017/0244557 A1 | 8/2017 | Riel |
| 2017/0244787 A1 | 8/2017 | Rangasamy |
| 2017/0293450 A1 | 10/2017 | Battaje |
| 2017/0322954 A1 | 11/2017 | Horowitz |
| 2017/0337492 A1 | 11/2017 | Chen |
| 2017/0371551 A1 | 12/2017 | Sachdev |
| 2018/0006896 A1 | 1/2018 | MacNamara |
| 2018/0024889 A1 | 1/2018 | Verma |
| 2018/0046553 A1 | 2/2018 | Okamoto |
| 2018/0082053 A1 | 3/2018 | Brown |
| 2018/0107419 A1 | 4/2018 | Sachdev |
| 2018/0113625 A1 | 4/2018 | Sancheti |
| 2018/0113770 A1 | 4/2018 | Hasanov |
| 2018/0136931 A1 | 5/2018 | Hendrich |
| 2018/0137306 A1 | 5/2018 | Brady |
| 2018/0150306 A1 | 5/2018 | Govindaraju |
| 2018/0159745 A1 | 6/2018 | Byers |
| 2018/0165170 A1 | 6/2018 | Hegdal |
| 2018/0218000 A1 | 8/2018 | Setty |
| 2018/0225140 A1 | 8/2018 | Titus |
| 2018/0225216 A1 | 8/2018 | Filippo |
| 2018/0246670 A1 | 8/2018 | Baptist |
| 2018/0246745 A1* | 8/2018 | Aronovich .......... G06F 9/45545 |
| 2018/0247064 A1* | 8/2018 | Aronovich .......... G06F 21/6209 |
| 2018/0267820 A1 | 9/2018 | Jang |
| 2018/0276215 A1 | 9/2018 | Chiba |
| 2018/0285164 A1 | 10/2018 | Hu |
| 2018/0285223 A1 | 10/2018 | McBride |
| 2018/0285353 A1 | 10/2018 | Ramohalli |
| 2018/0287883 A1 | 10/2018 | Joshi |
| 2018/0288129 A1 | 10/2018 | Joshi |
| 2018/0300653 A1 | 10/2018 | Srinivasan |
| 2018/0302335 A1 | 10/2018 | Gao |
| 2018/0329981 A1 | 11/2018 | Gupte |
| 2018/0364917 A1 | 12/2018 | Ki |
| 2018/0365092 A1 | 12/2018 | Linetskiy |
| 2018/0375728 A1 | 12/2018 | Gangil |
| 2019/0004704 A1 | 1/2019 | Rathi |
| 2019/0065061 A1 | 2/2019 | Kim |
| 2019/0065323 A1 | 2/2019 | Dhamdhere |
| 2019/0073132 A1 | 3/2019 | Zhou |
| 2019/0073372 A1 | 3/2019 | Venkatesan |
| 2019/0079928 A1 | 3/2019 | Kumar |
| 2019/0089651 A1 | 3/2019 | Pignataro |
| 2019/0102226 A1 | 4/2019 | Caldato |
| 2019/0109756 A1 | 4/2019 | Abu Lebdeh |
| 2019/0116690 A1 | 4/2019 | Chen |
| 2019/0132203 A1 | 5/2019 | Wince |
| 2019/0148932 A1 | 5/2019 | Benesch |
| 2019/0156023 A1* | 5/2019 | Gerebe ................. G06F 21/54 |
| 2019/0163460 A1 | 5/2019 | Kludy |
| 2019/0188094 A1 | 6/2019 | Ramamoorthi |
| 2019/0190803 A1 | 6/2019 | Joshi |
| 2019/0199601 A1 | 6/2019 | Lynar |
| 2019/0213080 A1 | 7/2019 | Alluboyina |
| 2019/0213085 A1 | 7/2019 | Alluboyina |
| 2019/0215313 A1 | 7/2019 | Doshi |
| 2019/0220266 A1 | 7/2019 | Doshi |

(56) References Cited

U.S. PATENT DOCUMENTS

| | | |
|---|---|---|
| 2019/0220315 A1 | 7/2019 | Vallala |
| 2019/0235895 A1 | 8/2019 | Ovesea |
| 2019/0250849 A1 | 8/2019 | Compton |
| 2019/0272205 A1 | 9/2019 | Jiang |
| 2019/0278624 A1 | 9/2019 | Bade |
| 2019/0324666 A1 | 10/2019 | Kusters |
| 2019/0334727 A1 | 10/2019 | Kaufman |
| 2019/0335551 A1 | 10/2019 | Williams |
| 2019/0361748 A1 | 11/2019 | Walters |
| 2019/0369273 A1 | 12/2019 | Liu |
| 2019/0370018 A1 | 12/2019 | Kirkpatrick |
| 2020/0019414 A1 | 1/2020 | Byard |
| 2020/0026635 A1 | 1/2020 | Gaber |
| 2020/0034193 A1 | 1/2020 | Jayaram |
| 2020/0034254 A1 | 1/2020 | Natanzon |
| 2020/0065406 A1 | 2/2020 | Ippatapu |
| 2020/0073586 A1 | 3/2020 | Kurata |
| 2020/0083909 A1 | 3/2020 | Kusters |
| 2020/0150977 A1 | 5/2020 | Wang |
| 2020/0162330 A1 | 5/2020 | Vadapalli |
| 2020/0257519 A1 | 8/2020 | Shen |
| 2020/0310774 A1 | 10/2020 | Zhu |
| 2020/0310915 A1 | 10/2020 | Alluboyina |
| 2020/0344326 A1 | 10/2020 | Ghosh |
| 2020/0356537 A1 | 11/2020 | Sun |
| 2020/0412625 A1 | 12/2020 | Bagarolo |
| 2021/0011775 A1 | 1/2021 | Baxter |
| 2021/0029000 A1 | 1/2021 | Mordani |
| 2021/0042151 A1 | 2/2021 | Muller |
| 2021/0064536 A1 | 3/2021 | Palmer |
| 2021/0067607 A1 | 3/2021 | Gardner |
| 2021/0126839 A1 | 4/2021 | Rudrachar |
| 2021/0141655 A1 | 5/2021 | Gamage |
| 2021/0157622 A1 | 5/2021 | Ananthapur |
| 2021/0168034 A1 | 6/2021 | Qian |
| 2021/0271506 A1 | 9/2021 | Ganguly |
| 2021/0406079 A1 | 12/2021 | Atur |

OTHER PUBLICATIONS

Fast and Secure Append-Only storage with Infinite Capacity, Zheng.
User Mode and Kernel Mode, Microsoft.
Implementing time critical functionalities with a distributed adaptive container architecture, Stankovski.
Precise memory leak detection for java software using container profiling, Xu.
Segment map, Google, Feb. 4, 2019.
Fast and Secure Append-Only storage with Infinite Capacity, Zheng, Aug. 27, 2003.
User Mode and Kernel Mode, Microsoft, Apr. 19, 2017.
Precise memory leak detection for java software using container profiling, Xu, Jul. 2013.
Mogi et al., "Dynamic Parity Stripe Reorganizations for RAID5 Disk Arrays," 1994, IEEE, pp. 17-26.
Syed et al, "The Container Manager Pattern", ACM, pp. 1-9 (Year 2017).
Rehmann et al., "Performance of Containerized Database Management Systems", ACM, pp. 1-6 (Year 2018).
Awada et al, "Improving Resource Efficiency of Container-instance Clusters on Clouds", IEEE, pp. 929-934 (Year 2017).
Stankovski et al, "Implementing Time-Critical Functionalities with a Distributed Adaptive Container Architecture", ACM, pp. 1-5 (Year 2016).
Dhakate et al, "Distributed Cloud Monitoring Using Docker as Next Generation Container Virtualization Technology" IEEE, pp. 1-5 (Year 2015).
Crameri et al, "Staged Deployment in Mirage, an Integrated Software Upgrade Testing and Distribution System", ACM, pp. 221-236 (Year: 2007).
Cosmo et al, "Packages Upgrades in FOSS Distributions: Details and Challenges", AC 2008).
Burg et al, "Atomic Upgrading of Distributed Systems", ACM, pp. 1-5 (Year: 2008).
Souer et al, "Component Based Architecture for Web Content Management: Runtime Deployable Web Manager Component Bundles", IEEE, pp. 366-369 (Year: 2008).
Weingartner et al, "A distributed autonomic management framework for cloud computing orchestration." In 2016 IEEE World Congress on Services (Year: 2016).

* cited by examiner

IMPLEMENTING APPLICATION ENTRYPOINTS WITH CONTAINERS OF A BUNDLED APPLICATION

BACKGROUND

Field of the Invention

This invention relates to orchestration of roles in an application instantiated in a distributed storage and computation system.

Background of the Invention

In many contexts, it is helpful to be able to return a database or distributed application to an original state or some intermediate state. In this manner, changes to the distributed application or other database configuration parameters may be tested without fear of corrupting critical data.

The systems and methods disclosed herein provide an improved approach for creating snapshots of a database and returning to a previous snapshot.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
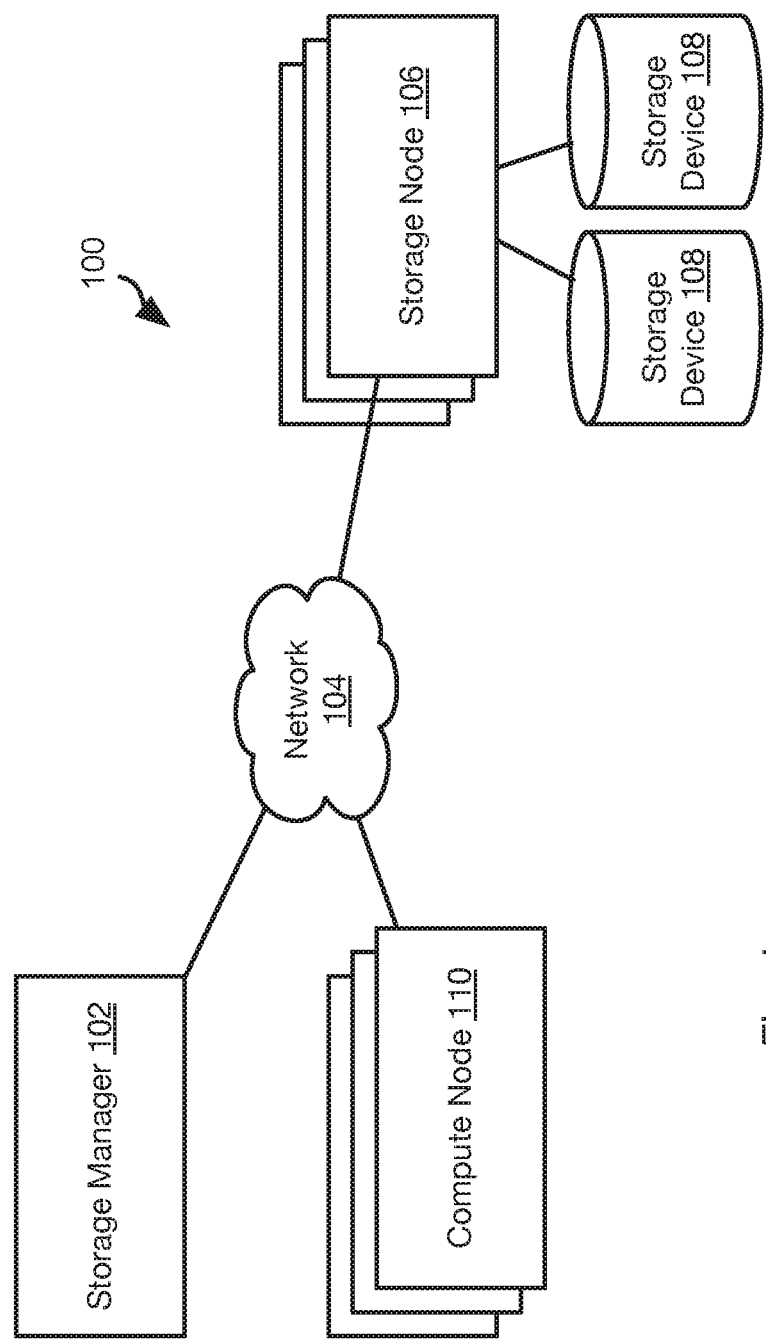
FIG. 1 is a schematic block diagram of a network environment for implementing methods in accordance with an embodiment of the present invention.

Referring to FIG. 1, the methods disclosed herein may be performed using the illustrated network environment 100.

The network environment 100 includes a storage manager 102 that coordinates the creation of snapshots of storage volumes and maintains records of where snapshots are stored within the network environment 100. In particular, the storage manager 102 may be connected by way of a network 104 to one or more storage nodes 106, each storage node having one or more storage devices 108, e.g. hard disk drives, flash memory, or other persistent or transitory memory. The network 104 may be a local area network (LAN), wide area network (WAN), or any other type of network including wired, fireless, fiber optic, or any other type of network connections.

One or more compute nodes 110 are also coupled to the network 104 and host user applications that generate read and write requests with respect to storage volumes managed by the storage manager 102 and stored within the memory devices 108 of the storage nodes 108.

The methods disclosed herein ascribe certain functions to the storage manager 102, storage nodes 106, and compute node 110. The methods disclosed herein are particularly useful for large scale deployment including large amounts of data distributed over many storage nodes 106 and accessed by many compute nodes 110. However, the methods disclosed herein may also be implemented using a single computer implementing the functions ascribed herein to some or all of the storage manager 102, storage nodes 106, and compute node 110.

Figure 2:
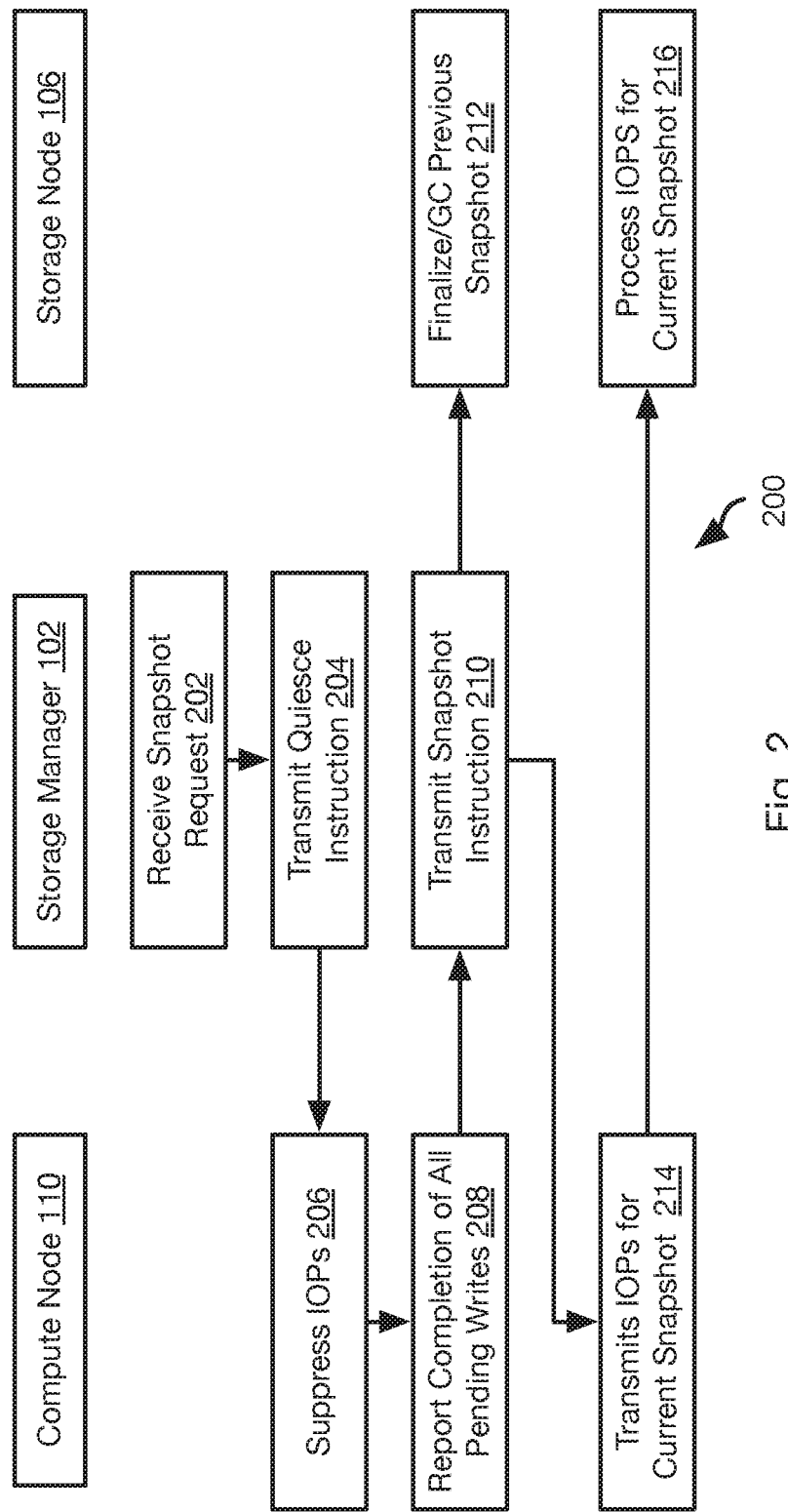
FIG. 2 is a process flow diagram of a method for coordinating snapshot creation with compute nodes and storage nodes in accordance with an embodiment of the present invention.

Referring to FIG. 2, the illustrated method 200 may be performed in order to invoke the creation of a new snapshot. Other than a current snapshot, which is still subject to change, a snapshot captures the state of a storage volume at a moment in time and is not altered in response to subsequent writes to the storage volume.

The method 200 includes receiving, by the storage manager 102 a request to create a new snapshot for a storage volume. A storage volume as referred to herein may be a virtual storage volume that may divided into individual slices. For example, storage volumes as described herein may be 1 TB and be divided into 1 GB slices. In general, a slice and its snapshot are stored on a single storage node 106, whereas a storage volume may have the slices thereof stored by multiple storage nodes 106.

The request received at step 202 may be received from a human operator or generated automatically, such as according to backup scheduler executing on the storage manager 102 or some other computing device. The subsequent steps of the method 200 may be executed in response to receiving 202 the request The method 200 may include transmitting 204 a quiesce instruction to all compute nodes 110 that are associated with the storage volume. For example, all compute nodes 110 that have pending write requests to the storage volume. In some embodiments, the storage manager 102 may store a mapping of compute nodes 110 to a particular storage volume used by the compute nodes 110. Accordingly, step 204 may include sending 204 the quiesce instruction to all of these compute nodes. Alternatively, the instruction may be transmitted 204 to all compute nodes 110 and include an identifier of the storage volume. The compute nodes 110 may then suppress any write instructions referencing that storage volume.

The quiesce instruction instructs the compute nodes 110 that receive it to suppress 206 transmitting write requests to the storage nodes 106 for the storage volume referenced by the quiesce instruction. The quiesce instruction may further cause the compute nodes 110 that receive it to report 208 to the storage manager 102 when no write requests are pending for that storage volume, i.e. all write requests issued to one or more storage nodes 106 and referencing slices of that storage volume have been acknowledged by the one or more storage nodes 106.

In response to receiving the report of step 208 from one or more compute nodes, e.g. all compute nodes that are mapped to the storage node that is the subject of the snapshot request of step 202, the storage manager 102 transmits 210 an instruction to the storage nodes 106 associated with the storage volume to create a new snapshot of that storage volume. Step 210 may further include transmitting 210 an instruction to the compute nodes 110 associated with the storage volume to commence issuing write commands to the storage nodes 106 associated with the storage volume. In some embodiments, the instruction of step 110 may include an identifier of the new snapshot. Accordingly, subsequent input/output operations (IOPs) transmitted 214 from the compute nodes may reference that snapshot identifier. Likewise, the storage node 106 may associate the snapshot identifier with data subsequently written to the storage volume, as described in greater detail below.

In response to receiving 210 the instruction to create a new snapshot, each storage node 106 finalizes 212 segments associated with the current snapshot, which may include performing garbage collection, as described in greater detail below. In addition, subsequent IOPs received by the storage node may also be processed 216 using the new snapshot as the current snapshot, as is also described in greater detail below.

Figure 3:
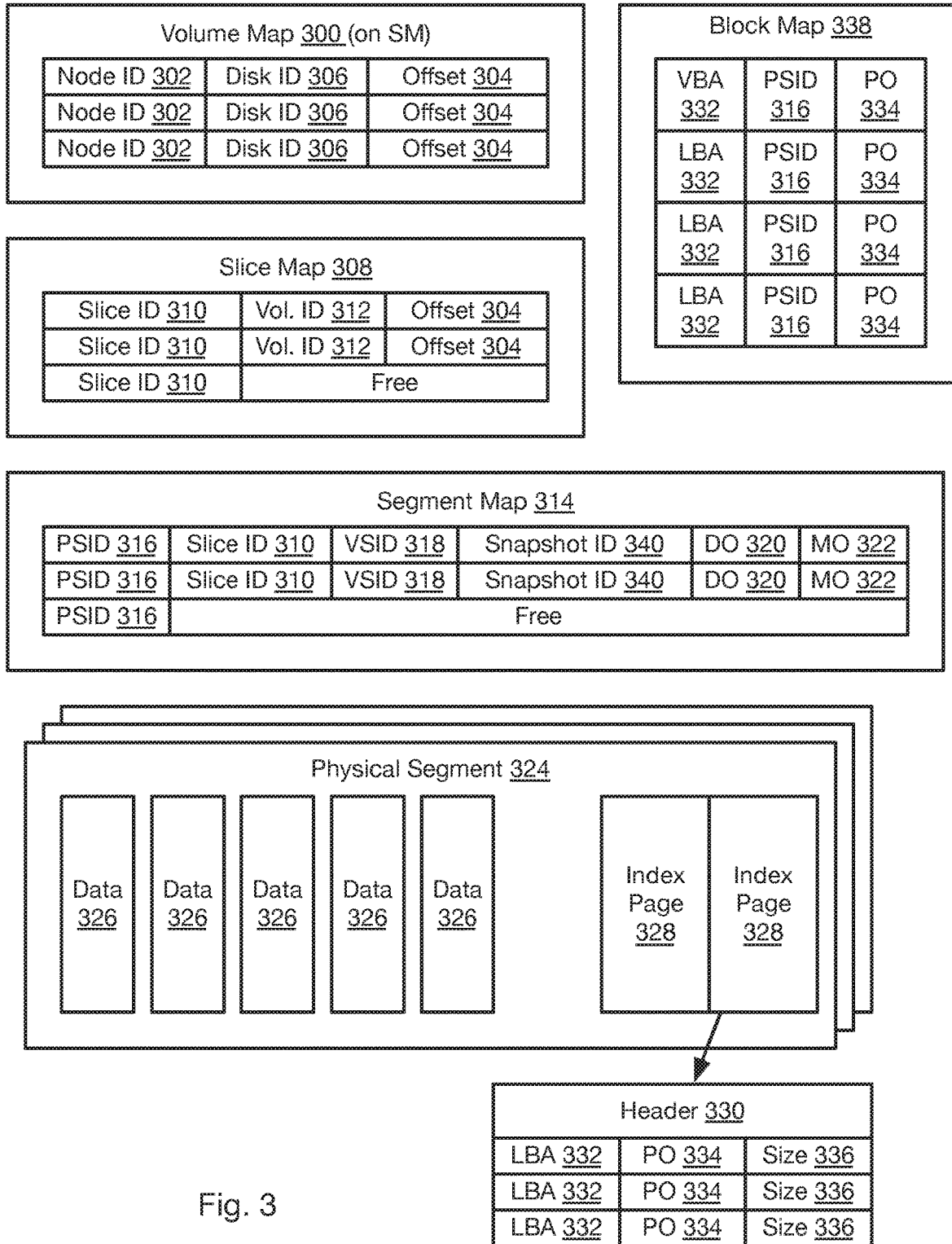
FIG. 3 is a schematic diagram illustrating the storage of data within a storage node in accordance with an embodiment of the present invention.

Referring to FIG. 3, the method by which slices are allocated, reassigned, written to, and read from may be understood with respect to the illustrated data storage scheme. The data of the storage scheme may be stored in transitory or persistent memory of the storage node 106, such as in the storage devices 108.

For each logical volume, the storage manager 102 may store and maintain a volume map 300. For each slice in the logical volume, the volume map may include an entry including a node identifier 302 identifying the storage node 106 to which the slice is assigned and an offset 304 within the logical volume at which the slice begins. In some embodiments, slices are assigned both to a storage node 106 and a specific storage device hosted by the storage node 106. Accordingly, the entry may further include a disk identifier of the storage node 106 referencing the specific storage device to which the slice is assigned.

The remaining data structures of FIG. 3 are stored on each storage node 106. The storage node 106 may store a slice map 308. The slice map 308 may include entries including a local slice identifier 310 that uniquely identifies each slice of the storage node 106, e.g. each slice of each storage device hosted by the storage node 106. The entry may further include a volume identifier 312 that identifies the logical volume to which the local slice identifier 310 is assigned. The entry may further include the offset 304 within the logical volume of the slice of the logical volume assigned to the storage node 106.

In some embodiments, an entry in the slice map 308 is created for a slice of the logical volume only after a write request is received that references the offset 304 for that slice. This further supports the implementation of overprovisioning such that slices may be assigned to a storage node 106 in excess of its actual capacity since the slice is only tied up in the slice map 308 when it is actually used.

The storage node 106 may further store and maintain a segment map 314. The segment map 314 includes entries either including or corresponding to a particular physical segment identifier (PSID) 316. For example, the segment map 314 may be in an area of memory such that each address in that area corresponds to one PSID 316 such that the entry does not actually need to include the PSID 316. The entries of the segment map 314 may further include a slice identifier 310 that identifies a local slice of the storage node 106 to which the PSID 316 has been assigned. The entry may further include a virtual segment identifier (VSID) 318. As described in greater detail below, each time a segment is assigned to logical volume and a slice of a logical volume, it may be assigned a VSID 318 such that the VSIDs 318 increase in value monotonically in order of assignment. In this manner, the most recent PSID 316 assigned to a logical volume and slice of a logical volume may easily be determined by the magnitude of the VSIDs 318 mapped to the PSIDs 316. In some embodiments, VSIDs 318 are assigned in a monotonically increasing series for all segments assigned to volume ID 312. In other embodiments, each offset 304 and its corresponding slice ID 310 is assigned VSIDs separately, such that each slice ID 310 has its own corresponding series of monotonically increasing VSIDs 318 assigned to segments allocated to that slice ID 310.

The entries of the segment map 314 may further include a data offset 320 for the PSID 316 of that entry. As described in greater detail below, when data is written to a segment it may be written at a first open position from a first end of the segment. Accordingly, the data offset 320 may indicate the location of this first open position in the segment. The data offset 320 for a segment may therefore be updated each time data is written to the segment to indicate where the new first open position is.

The entries of the segment map 314 may further include a metadata offset 322. As described in detail below, for each write request written to a segment, a metadata entry may be stored in that segment at a first open position from a second end of the segment opposite the first end. Accordingly, the metadata offset 322 in an entry of the segment map 314 may indicate a location of this first open position of the segment corresponding to the entry.

Each PSID 316 corresponds to a physical segment 324 on a device hosted by the storage node 106. As shown, data payloads 326 from various write requests are written to the physical segment 324 starting from a first end (left) of the physical segment. The physical segment may further store index pages 328 such that index pages are written starting from a second end (right) of the physical segment 324.

Each index page 328 may include a header 330. The header 330 may be coded data that enables identification of a start of an index page 328. The entries of the index page 328 each correspond to one of the data payloads 326 and are written in the same order as the data payloads 326. Each entry may include a logical block address (LBA) 332. The LBA 332 indicates an offset within the logical volume to which the data payload corresponds. The LBA 332 may indicate an offset within a slice of the logical volume. For example, inasmuch as the PSID 316 is mapped to a slice ID 310 that is mapped to an offset 304 within a particular volume ID 312, maps 308 and 314, and an LBA 332 within the slice may be mapped to the corresponding offset 304 to obtain a fully resolved address within the logical volume.

In some embodiments, the entries of the index page 328 may further include a physical offset 334 of the data payload 326 corresponding to that entry. Alternatively or additionally, the entries of the index page 328 may include a size 336 of the data payload 326 corresponding to the entry. In this manner, the offset to the start of a data payload 326 for an entry may be obtained by adding up the sizes 336 of previously written entries in the index pages 328.

The metadata offset 322 may point to the last index page 328 (furthest from right in illustrated example) and may further point to the first open entry in the last index page 328. In this manner, for each write request, the metadata entry for that request may be written to the first open position in the last index page 328. If all of the index pages 328 are full, a new index page 328 may be created and stored at the first open position from the second end and the metadata for the write request may be added at the first open position in that index page 328.

The storage node 106 may further store and maintain a block map 338. A block map 338 may be maintained for each logical volume and/or for each slice offset of each logical volume, e.g. for each local slice ID 310 which is mapped to a slice offset and logical volume by slice map 308. The entries of the block map 338 map include entries corresponding to each LBA 332 within the logical volume or slice of the logical volume. The entries may include the LBA 332 itself or may be stored at a location within the block map corresponding to an LBA 332.

The entry for each LBA 332 may include the PSID 316 identifying the physical segment 324 to which a write request referencing that LBA was last written. In some embodiments, the entry for each LBA 332 may further indicate the physical offset 334 within that physical segment 324 to which the data for that LBA was written. Alternatively, the physical offset 324 may be obtained from the index pages 328 of that physical segment. As data is written to an LBA 332, the entry for that LBA 332 may be overwritten to indicate the physical segment 324 and physical offset 334 within that segment 324 to which the most recent data was written.

In embodiments implementing multiple snapshots for a volume and slice of a volume, the segment map 314 may additionally include a snapshot ID 340 identifying the snapshot to which the PSID 316 has been assigned. In particular, each time a segment is allocated to a volume and slice of a volume, the current snapshot identifier for that volume and slice of a volume will be included as the snapshot ID 340 for that PSID 316.

In response to an instruction to create a new snapshot for a volume and slice of a volume, the storage node 106 will store the new current snapshot identifier, e.g. increment the previously stored current snapshot ID 340, and subsequently allocated segments will include the current snapshot ID 340. PSIDs 316 that are not filled and are allocated to the previous snapshot ID 340 may no longer be written to. Instead, they may be finalized or subject to garbage collection (see FIGS. 5 and 6).

Figure 4:
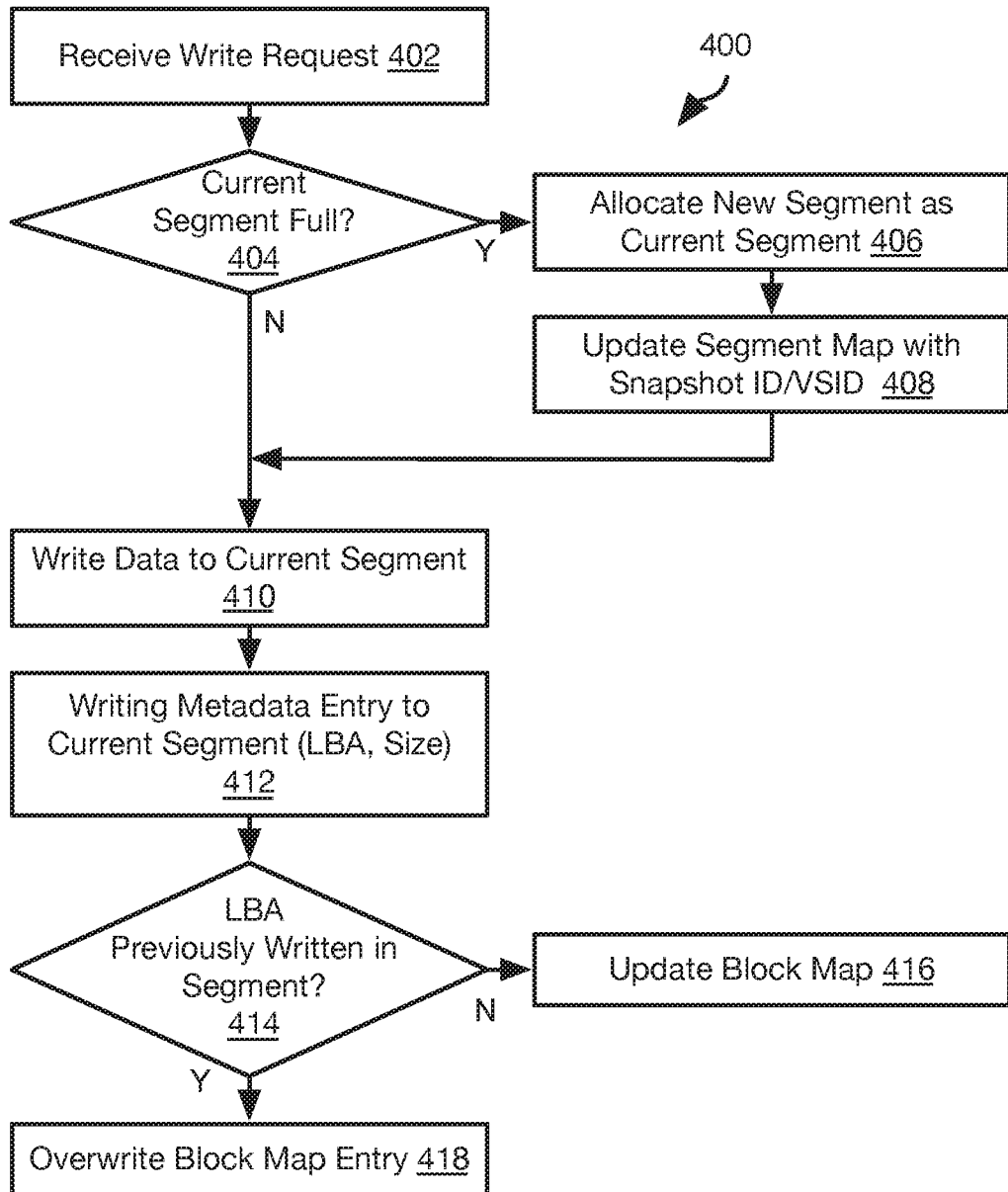
FIG. 4 is a process flow diagram of a method for processing write requests in a storage node in accordance with an embodiment of the present invention.

FIG. 4 illustrates a method 400 for executing write instructions by a storage node 106, such as write instructions received from an application executing on a compute node 110.

The method 400 includes receiving 402 a write request. The write request may include payload data, payload data size, and an LBA as well as fields such as a slice identifier, a volume identifier, and a snapshot identifier. Where a slice identifier is included, the LBA may be an offset within the slice, otherwise the LBA may be an address within the storage volume.

The method 400 may include evaluating 404 whether a PSID 316 is allocated to the snapshot referenced in the write request and whether the physical segment 324 corresponding to the PSID 316 ("the current segment") has space for the payload data. In some embodiments, as write requests are performed with respect to a PSID 316, the amount of data written as data 326 and index pages 328 may be tracked, such as by way of the data offset 320 and metadata offset 322 pointers. Accordingly, if the amount of previously-written data 326 and the number of allocated index pages 328 plus the size of the payload data and its corresponding metadata entry exceeds the capacity of the current segment it may be determined to be full at step 404.

If the current segment is determined 404 to be full, the method 400 may include allocating 406 a new PSID 316 as the current PSID 316 and its corresponding physical segment 324 as the current segment for the snapshot referenced in the write request. In some embodiments, the status of PSIDs 316 of the physical storage devices 108 may be flagged in the segment map 314 as allocated or free as a result of allocation and garbage collection, which is discussed below. Accordingly, a free PSID 316 may be identified in the segment map 314 and flagged as allocated.

The segment map 314 may also be updated 408 to include a slice ID 310 and snapshot ID 340 mapping the current PSID 316 to the snapshot ID, volume ID 312, and offset 304 included in the write request. Upon allocation, the current PSID 316 may also be mapped to a VSID (virtual segment identifier) 318 that will be a number higher than previously VSIDs 318 such that the VSIDs increase monotonically, subject, of course, to the size limit of the field used to store the VSID 318. However, the size of the field may be sufficiently large that it is not limiting in most situations.

The method 400 may include writing 410 the payload data to the current segment. As described above, this may include writing 410 payload data 326 to the free location closest to the first end of the current segment.

The method 400 may further include writing 412 a metadata entry to the current segment. This may include writing the metadata entry (LBA, size) to the first free location closest to the second end of the current segment. Alternatively, this may include writing the metadata entry to the first free location in an index page 328 that has room for it or creating a new index page 328 located adjacent a previous index page 328. Steps 410, 412 may include updating one or more pointers or table that indicates an amount of space available in the physical segment, such as a pointer 320 to the first free address closest to the first end and a pointer 322 to the first free address closest to the second end, which may be the first free address before the last index page 328 and/or the first free address in the last index page. In particular, these pointers may be maintained as the data offset 320 and metadata offset in the segment map 314 for the current PSID 316.

The method 400 may further include updating 416 the block map 338 for the current snapshot. In particular, for each LBA 332 referenced in the write request, an entry in the block map 338 for that LBA 332 may be updated to reference the current PSID 316. A write request may write to a range of LBAs 332. Accordingly, the entry for each LBA 332 in that range may be updated to refer to the current PSID 316.

Updating the block map 338 may include evaluating 414 whether an entry for a given LBA 332 referenced in the write request already exists in the block map 338. If so, then that entry is overwritten 418 to refer to the current PSID 316. If not, an entry is updated 416 in the block map 318 that maps the LBA 332 to the current PSID 316. In this manner, the block map 338 only references LBAs 332 that are actually written to, which may be less than all of the LBAs 332 of a storage volume or slice. In other embodiments, the block map 338 is of fixed size and includes and entry for each LBA 332 regardless of whether it has been written to previously. The block map 338 may also be updated to include the physical offset 334 within the current segment to which the data 326 from the write request was written.

In some embodiments, the storage node 106 may execute multiple write requests in parallel for the same LBA 332. Accordingly, it is possible that a later write can complete first and update the block map 338 whereas a previous write request to the same LBA 332 completes later. The data of the previous write request is therefore stale and the block map 338 should not be updated.

Suppressing of updating the block map 338 may be achieved by using the VSIDs 318 and physical offset 334. When executing a write request for an LBA, the VSID 318 mapped to the segment 324 and the physical offset 334 to which the data is to be, or was, written may be compared to the VSID 318 and offset 334 corresponding to the entry in the block map 338 for the LBA 332. If the VSID 318 mapped in the segment map 314 to the PSID 316 in the entry of the block map 338 corresponding to the LBA 332, then the block map 338 will not be updated. Likewise, if the VSID 318 corresponding to the PSID 316 in the block map 338 is the same as the VSID 318 for the write request and the physical offset 334 in the block map 338 is higher than the offset 334 to which the data of the write request is to be or was written, the block map 338 will not be updated for the write request.

As a result of steps 414-418, the block map 338 only lists the PSID 316 where the valid data for a given LBA 332 is stored. Accordingly, only the index pages 328 of the physical segment 324 mapped to the PSID 316 listed in the block map 338 need be searched to find the data for a given LBA 332. In instances where the physical offset 334 is stored in the block map 338, no searching is required.

Figure 5:
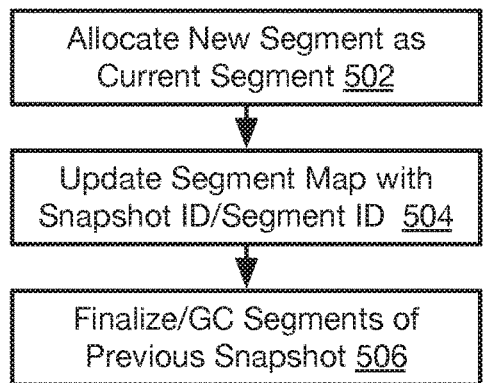
FIG. 5 is a process flow diagram of a method for processing a snapshot instruction by a storage node in accordance with an embodiment of the present invention.

FIG. 5 illustrates a method 500 executed by a storage node 106 in response to the new snapshot instruction of step 210 for a storage volume. The method 500 may be executed in response to an explicit instruction to create a new snapshot or in response to a write request that includes a new snapshot ID 340. The method 500 may also be executed with respect to a current snapshot that is still being addressed by new write requests. For example, the method 500 may be executed periodically or be triggered based on usage.

The method 500 may include allocating 502 a new PSID 316 and its corresponding physical segment 324 as the current PSID 316 and current segment for the storage volume, e.g., by including a slice ID 310 corresponding to a volume ID 312 and offset 304 included in the new snapshot instruction or the write request referencing the new snapshot ID 340. Allocating 502 a new segment may include updating 504 an entry in the segment map 314 that maps the current PSID 316 to the snapshot ID 340 and a slice ID 310 corresponding to a volume ID 312 and offset 304 included in the new snapshot instruction.

As noted above, when a PSID 316 is allocated, the VSID 318 for that PSID 316 may be a number higher than all VSIDs 318 previously assigned to that volume ID 312, and possibly to that slice ID 310 (where slices have separate series of VSIDs 318). The snapshot ID 340 of the new snapshot may be included in the new snapshot instruction or the storage node 106 may simply assign a new snapshot ID that is the previous snapshot ID 340 plus one.

The method 500 may further include finalizing 506 and performing garbage collection with respect to PSIDs 316 mapped to one or more previous snapshots IDs 340 for the volume ID 312 in the segment map 314, e.g., PSIDs 316 assigned to the snapshot ID 340 that was the current snapshot immediately before the new snapshot instruction was received.

Figure 6:
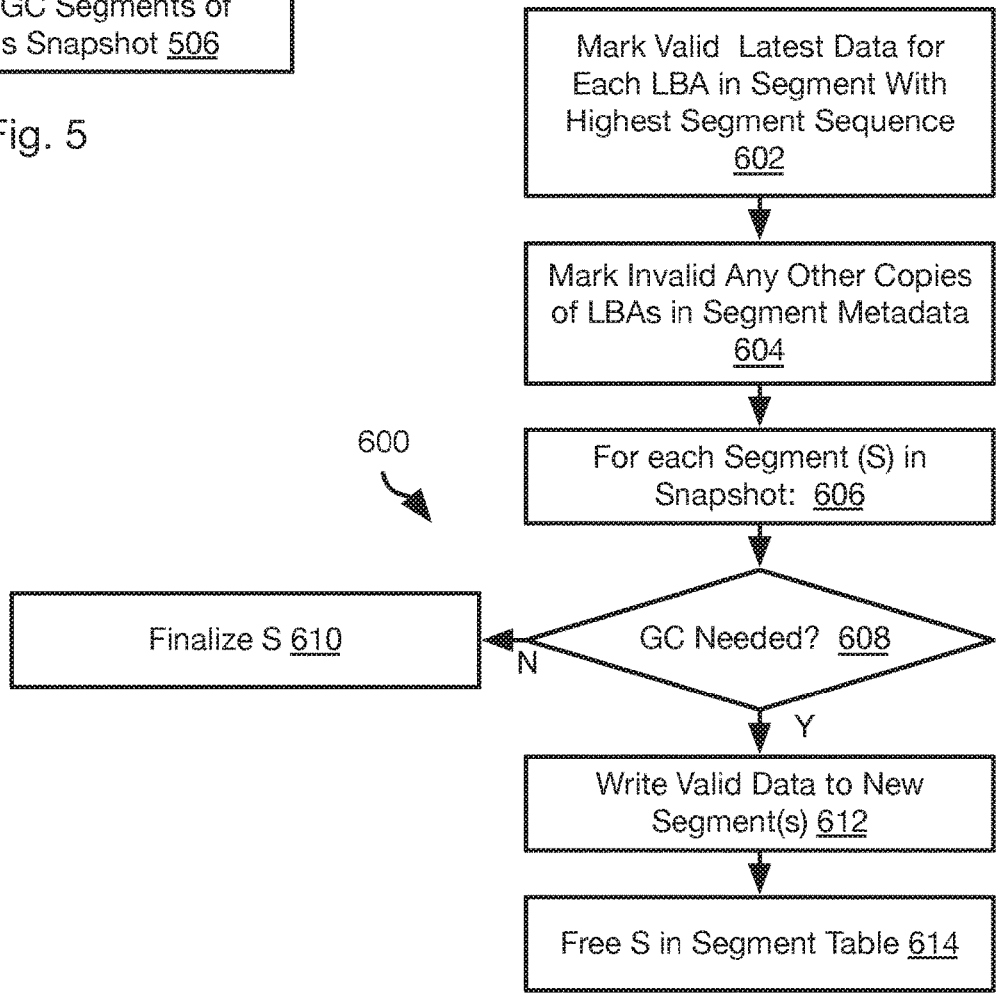
FIG. 6 is a process flow diagram of a method for performing garbage collection on segments in accordance with an embodiment of the present invention.

FIG. 6 illustrates a method 600 for finalizing and performing garbage collection with respect to segment IDs 340 for a snapshot ("the subject snapshot"), which may include the current snapshot or a previous snapshot. The method 600 may include marking 602 as valid latest-written data for an LBA 332 in the PSID 316 having the highest VSID 318 in the segment map 314 and to which data was written for that LBA 332. Marking 602 data as valid may include making an entry in a separate table that lists the location of valid data or entries for metadata in a given physical segment 324 or setting a flag in the metadata entries stored in the index pages 328 of a physical segment 324, e.g., a flag that indicates that the data referenced by that metadata is invalid or valid.

Note that the block map 338 records the PSID 316 for the latest version of the data written to a given LBA 332. Accordingly, any references to that LBA 332 in the physical segment 324 of a PSID 316 mapped to a lower-numbered VSID 318 may be marked 604 as invalid. For the physical segment 324 of the PSID 316 in the block map 338 for a given LBA 332, the last metadata entry for that LBA 332 may be found and marked as valid, i.e. the last entry referencing the LBA 332 in the index page 328 that is the last index page 328 including a reference to the LBA 332. Any other references to the LBA 332 in the physical segment 324 may be marked 604 as invalid. Note that the physical offset 334 for the LBA 332 may be included in the block map 334, so all metadata entries not corresponding to that physical offset 334 may be marked as invalid.

The method 600 may then include processing 606 each segment ID S of the PSIDs 316 mapped to the subject snapshot according to steps 608-620. In some embodiments, the processing of step 606 may exclude a current PSID 316, i.e. the last PSID 302 assigned to the subject snapshot. As described below, garbage collection may include writing valid data from a segment to a new segment. Accordingly, step 606 may commence with the PSID 316 having the lowest-valued VSID 318 for the subject snapshot. As any segments 324 are filled according to the garbage collection process, they may also be evaluated to be finalized or subject to garbage collection as described below.

The method 600 may include evaluating 608 whether garbage collection is needed for the segment ID S. This may include comparing the amount of valid data in the physical segment 324 for the segment ID S to a threshold. For example, if only 40% of the data stored in the physical segment 324 for the segment ID S has been marked valid, then garbage collection may be determined to be necessary. Other thresholds may be used, such as value between 30% and 80%. In other embodiments, the amount of valid data is compared to the size of the physical segment 324, e.g., the segment ID S is determined to need garbage collection if the amount of valid data is less than X % of the size of the physical segment 324, where X is a value between 30 and 80, such as 40.

If garbage collection is determined 608 not to be needed, the method 600 may include finalizing 610 the segment ID S. Finalizing may include flagging the segment ID S in the segment map 314 as full and no longer available to be written to. This flag may be stored in another table that lists finalized PSIDs 316.

If garbage collection is determined 608 to be needed, then the method 600 may include writing 612 the valid data to a new segment. For example, if the valid data may be written to a current PSID 316, i.e. the most-recently allocated PSID 316 for the subject snapshot, until its corresponding physical segment 324 full. If there is no room in the physical segment 324 for the current PSID 316, step 612 may include assigning a new PSID 316 as the current PSID 316 for the subject snapshot. The valid data, or remaining valid data, may then be written to the physical segment 324 corresponding to the current PSID 316 for the subject snapshot.

Note that writing 612 the valid data to the new segment maybe processed in the same manner as for any other write request (see FIG. 4) except that the snapshot ID used will be the snapshot ID 340 of the subject snapshot, which may not be the current snapshot ID. In particular, the manner in which the new PSID 316 is allocated to the subject snapshot may be performed in the same manner described above with respect to steps 406-48 of FIG. 4. Likewise, the manner in which the valid data is written to the current segment may be performed in the same manner as for steps 410-412 of FIG. 4. In some embodiments, writing of valid data to a new segment as part of garbage collection may also include updating the block map with the new location of the data for an LBA 332, such as according to steps 414-418 of FIG. 4. When the physical segment 324 of the current PSID 316 is found to be full, it may itself be subject to the process 600 by which it is finalized or subject to garbage collection.

After the valid data is written to a new segment, the method 600 may further include freeing 614 the PSID S in the segment map 314, e.g., marking the entry in segment map 314 corresponding to PSID S as free.

The process of garbage collection may be simplified for PSIDs 316 that are associated with the subject snapshot in the segment map 314 but are not listed in the block map 338 with respect to any LBA 332. The physical segments 324 of such PSIDs 316 do not store any valid data. Entries for such PSIDs 316 in the segment map 314 may therefore simply be deleted and marked as free in the segment map 314

Figure 7:
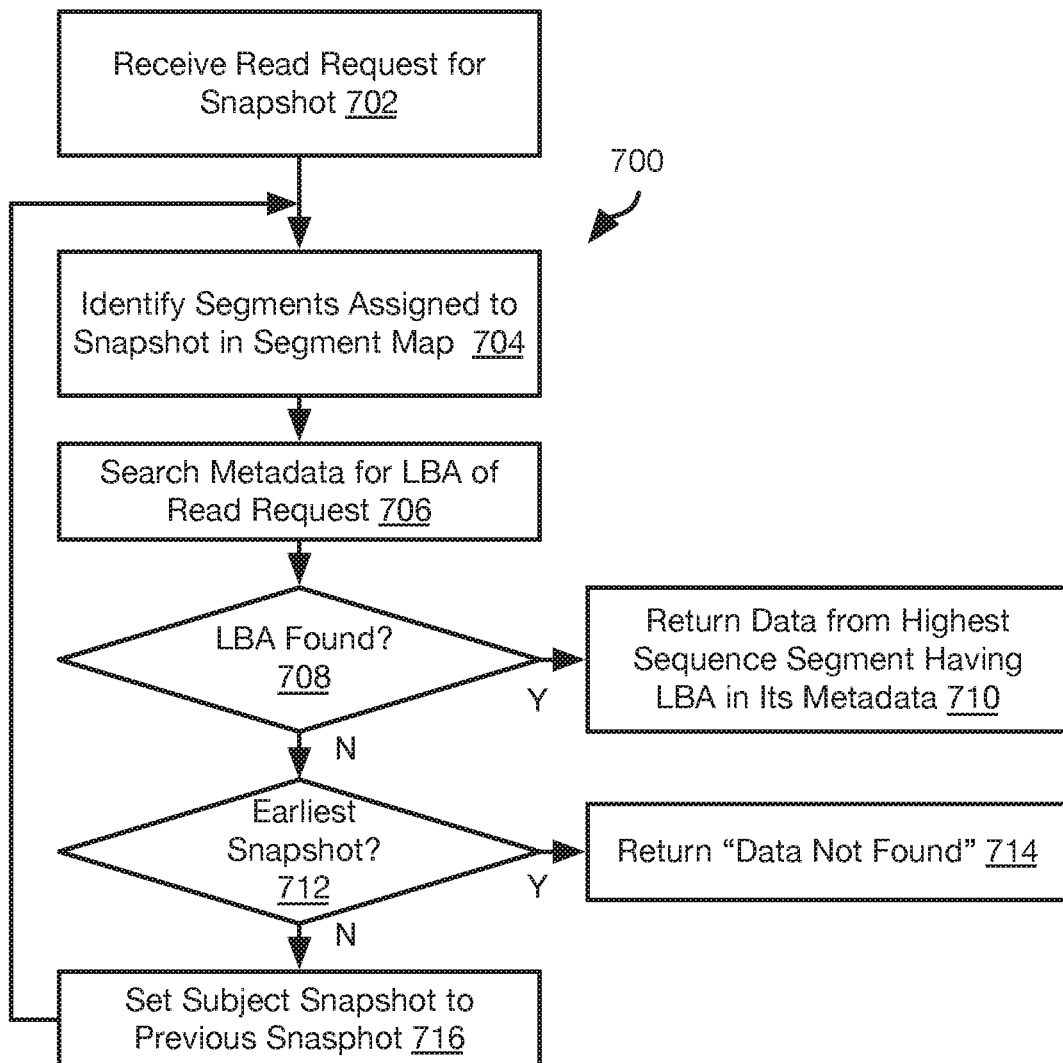
FIG. 7 is a process flow diagram of a method for reading data from a snapshot in accordance with an embodiment of the present invention.

FIG. 7 illustrates a method 700 that may be executed by a storage node 106 in response to a read request. The read request may be received from an application executing on a compute node 110. The read request may include such information as a snapshot ID, volume ID (and/or slice ID), LBA, and size (e.g. number of 4 KB blocks to read).

The following steps of the method 700 may be initially executed using the snapshot ID 340 included in the read request as "the subject snapshot," i.e., the snapshot that is currently being processed to search for requested data. The method 700 includes receiving 702 the read request by the storage node 106 and identifying 704 one or more PSIDs 316 in the segment map 314 assigned to the subject snapshot and searching 706 the metadata entries for these PSIDs 316 for references to the LBA 332 included in the read request.

The searching of step 706 may be performed in order of decreasing VSID 318, i.e. such that the metadata entries for the last allocated PSID 316 is searched first. In this manner, if reference to the LBA 332 is found, the metadata of any previously-allocated PSIDs 316 does not need to be searched.

Searching 706 the metadata for a PSID 316 may include searching one or more index pages 328 of the physical segment 324 corresponding to the PSID 316. As noted above, one or more index pages 328 are stored at the second end of the physical segment 324 and entries are added to the index pages 328 in the order they are received. Accordingly, the last-written metadata including the LBA 332 in the last index page 328 (furthest from the second end of the physical segment 324) in which the LBA 332 is found will correspond to the valid data for that LBA 332. To locate the data 326 corresponding to the last-written metadata for the LBA 332 in the physical segment 324, the sizes 336 for all previously-written metadata entries may be summed to find a start address in the physical segment 324 for the data 326. Alternatively, if the physical offset 334 is included, then the data 326 corresponding to the metadata may be located without summing the sizes 336.

If reference to the LBA 332 is found 708 in the physical segment 324 for any of the PSIDs 316 allocated to the subject snapshot, the data 326 corresponding to the last-written metadata entry including that LBA 332 in the physical segment 324 mapped to the PSID 316 having the highest VSID 318 of all PSIDs 316 in which the LBA is found will be returned 710 to the application that issued the read request.

If the LBA 332 is not found in the metadata entries for any of the PSIDs 316 mapped to subject snapshot, the method 700 may include evaluating 712 whether the subject snapshot is the earliest snapshot for the storage volume of the read request on the storage node 106. If so, then the data requested is not available to be read and the method 700 may include returning 714 a "data not found" message or otherwise indicating to the requesting application that the data is not available.

If an earlier snapshot than the subject snapshot is present for the storage volume on the storage node 106, e.g., there exists at least one PSID 316 mapped to a snapshot ID 340 that is lower than the snapshot ID 340 of the subject snapshot ID, then the immediately preceding snapshot ID 340 will be set 716 to be the subject snapshot and processing will continue at step 704, i.e. the PSIDs 316 mapped to the subject snapshot will be searched for the LBA 332 in the read request as described above.

The method 700 is particularly suited for reading data from snapshots other than the current snapshot that is currently being written to. In the case of a read request from the current snapshot, the block map 338 may map each LBA 332 to the PSID 316 in which the valid data for that LBA 332 is written. Accordingly, for such embodiments, step 704 may include retrieving the PSID 332 for the LBA 332 in the write request from the block map 338 and only searching 706 the metadata corresponding to that PSID 316. Where the block map 338 stores a physical offset 334, then the data is retrieved from that physical offset within the physical segment 314 of the PSID 336 mapped to the LBA 332 of the read request.

In some embodiments, the block map 332 may be generated for a snapshot other than the current snapshot in order to facilitate executing read requests, such as where a large number of read requests are anticipated in order to reduce latency. This may include searching the index pages 328 of the segments 324 allocated to the subject snapshot and its preceding snapshots to identify, for each LBA 332 to which data has been written, the PSID 316 having the highest VSID 318 of the PSIDs 316 having physical segments 324 storing data written to the each LBA 332. This PSID 316 may then be written to the block map 318 for the each LBA 332. Likewise, the physical offset 334 of the last-written data for that LBA 332 within the physical segment 324 for that PSID 316 may be identified as described above (e.g., as described above with respect to steps 704-716).

Figure 8:
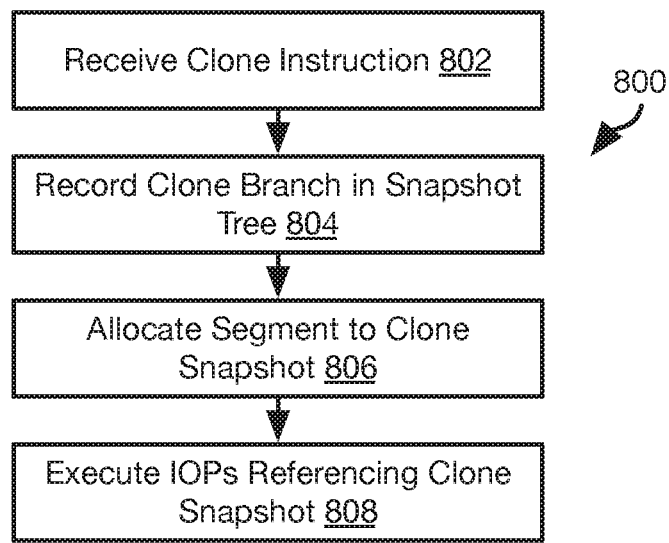
FIG. 8 is a process flow diagram of a method for cloning a snapshot in accordance with an embodiment of the present invention.

Referring to FIG. 8, in some instances it may be beneficial to clone a storage volume. This may include capturing a current state of a principal copy of a storage volume and making changes to it without affecting the principal copy of the storage volume. For purposes of this disclosure a "principal copy" or "principal snapshot" of a storage volume refers to an actual production copy that is part of a series of snapshots that is considered by the user to be the current, official, or most up-to-date copy of the storage volume. In contrast, a clone snapshot is a snapshot created for experimentation or evaluation but changes to it are not intended by the user to become part of the production copy of the storage volume. Stated differently, only one snapshot may be a principal snapshot with respect to an immediately preceding snapshot, independent of the purpose of the snapshot. Any other snapshots that are immediate descendants of the immediately preceding snapshot are clone snapshots.

The illustrated method 800 may be executed by the storage manager 102 and one or more storage nodes 106 in order to implement this functionality. The method 800 may include receiving 802 a clone instruction and executing the remaining steps of the method 800 in response to the clone instruction. The clone instruction may be received by the storage manager 102 from a user or be generated according to a script or other program executing on the storage manager 102 or a remote computing device in communication with the storage manager 102.

Figure 9:
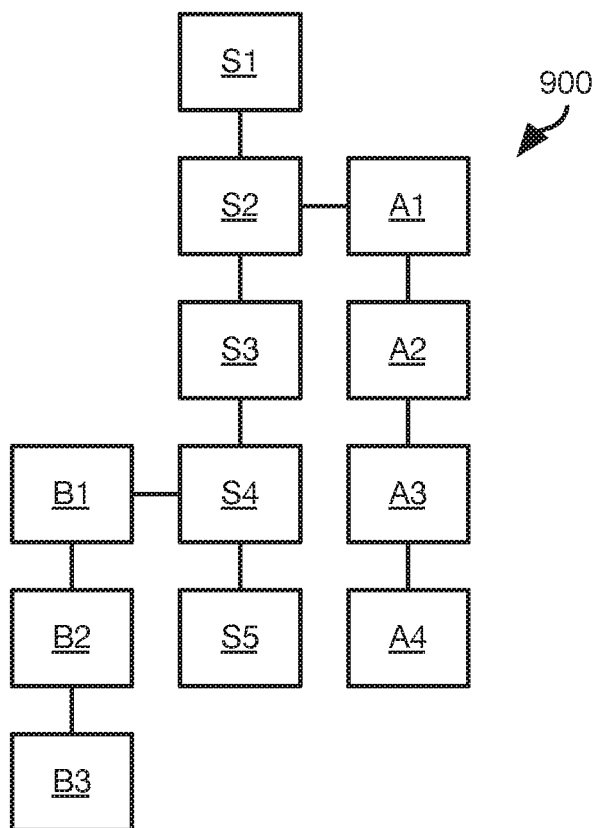
FIG. 9 illustrates a snapshot hierarchy created in accordance with an embodiment of the present invention.

The method 800 may include recording 804 a clone branch in a snapshot tree. For example, referring to FIG. 9, in some embodiments, for each snapshot that is created for a storage volume, the storage manager 102 may create a node S1-S5 in a snapshot hierarchy 900. In response to a clone instruction, the storage manager 102 may create a clone snapshot and branch to a node A1 representing the clone snapshot. In the illustrated example, a clone instruction was received with respect to the snapshot of node S2. This resulted in the creation of clone snapshot represented by node A1 that branches from node S2. Note node S3 and its descendants are also connected to node S2 in the hierarchy.

In some embodiments, the clone instruction may specify which snapshot the clone snapshot is of. In other embodiments, the clone instruction may be inferred to be a snapshot of a current snapshot. In such embodiments, a new principal snapshot may be created and become the current snapshot. The previous snapshot will then be finalized and be subject to garbage collection as described above. The clone will then branch from the previous snapshot. In the illustrated example, if node S2 represented the current snapshot, then a new snapshot represented by node S3 would be created. The snapshot of node S2 would then be finalized and subject to garbage collection and clone snapshot represented by A1 would be created and node A1 would be added to the hierarchy as a descendent of node S2.

In some embodiments, the clone node A1, and possibly its descendants A2 to A4 (representing subsequent snapshots of the clone snapshot), may be distinguished from the nodes S1 to S5 representing principal snapshots, such as by means of a flag, a classification of the connection between the node A1 and node S2 that is its immediate ancestor, or by storing data defining node A1 in a separate data structure.

Following creation of a clone snapshot, other principal snapshots of the storage volume may be created and added to represented in the hierarchy by one or more nodes S2 to S5. A clone may be created of any of these snapshots and represented by additional clone nodes. In the illustrated example, node B1 represents a clone snapshot of the snapshot represented by node S4. Subsequent snapshots of the clone snapshot are represented by nodes B1 to B3.

Referring again to FIG. 8, the creation of a clone snapshot on the storage node 106 may be performed in the identical manner as for any other snapshot, such as according to the methods of FIGS. 2 through 6. In particular, one or more segments 806 may be allocated to the clone snapshot on storage nodes 106 storing slices of the cloned storage volume and mapped to the clone snapshot. IOPs referencing the clone snapshot may be executed 808, such as according to the method 400 of FIG. 4.

In some instances, it may be desirable to store a clone snapshot on a different storage node 106 than the principal snapshots. Accordingly, the method 800 may include allocating 806 segments to the clone snapshot on the different storage node 106. This may be invoked by sending a new snapshot instruction referencing the clone snapshot (i.e., an identifier of the clone snapshot) to the different storage node 106 and instructing one or more compute nodes 110 to route IOPs for the clone snapshot to the different storage node 106.

The storage node 102 may store in each node of the hierarchy, data identifying one or more storage nodes 106 that store data for the snapshot represented by that node of the hierarchy. For example, each node may store or have associated therewith one or more identifiers of storage nodes 106 that store a particular snapshot ID for a particular volume ID. The node may further map one or more slice IDs (e.g., slice offsets) of a storage volume to one storage nodes 106 storing data for that slice ID and the snapshots for that slice ID.

Figure 10:
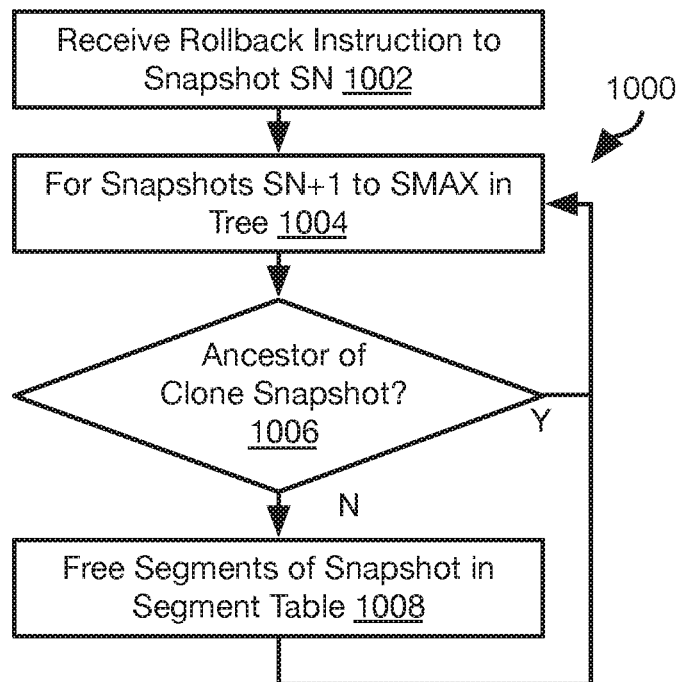
FIG. 10 is a process flow diagram of a method for rolling back to a prior snapshot in accordance with an embodiment of the present invention.

Referring to FIG. 10, one of the benefits of snapshots is the ability to capture the state of a storage volume such that it can be restored at a later time. FIG. 10 illustrates a method 1000 for rolling back a storage volume to a previous snapshot, particularly for a storage volume having one or more clone snapshots.

The method 1000 includes receiving 1002, by the storage manager 102, an instruction to rollback a storage volume to a particular snapshot SN. The method 1000 may then include processing 1004 each snapshot that is a represented by a descendent node of the node representing snapshot SN in the snapshot hierarchy, i.e. snapshots SN+1 to SMAX, where SMAX is the last principal snapshot that is a descendent of snapshot SN (each "descendent snapshot"). For each descendent snapshot, processing 1004 may include evaluating 1006 whether the each descendent is an ancestor of a node representing a clone snapshot. If not, then the storage manager 102 may instruct all storage nodes 106 storing segments mapped to the descendent snapshot to free 1008 these segments, i.e. delete entries from the segment map referencing the descendent snapshot and marking corresponding PSIDs 316 as free in the segment map 314.

If the descendent snapshot is found 1006 to be an ancestor of a clone snapshot, then step 1008 is not performed and the snapshot and any segments allocated to it are retained.

Figure 11:
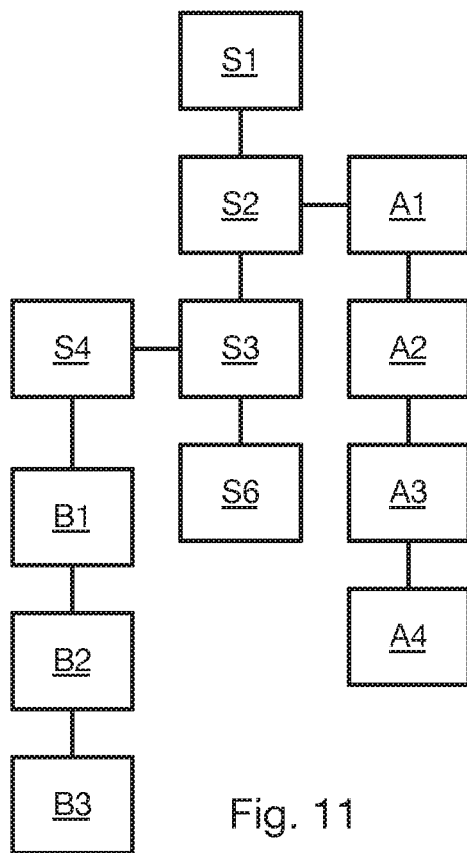
FIG. 11 illustrates the snapshot hierarchy of FIG. 9 as modified according to the method of FIG. 10 in accordance with an embodiment of the present invention.

FIG. 11 illustrates the snapshot hierarchy following execution of the method 1000 with respect to the snapshot represented by node S3. As is apparent, snapshot S5 has been removed from the hierarchy and any segments corresponding to these snapshots will have been freed on one or more storage nodes 106.

However, since node S4 is an ancestor of clone node B1, it is not removed and segments corresponding to it are not freed on one or more storage nodes in response to the roll back instruction. Inasmuch as each snapshot contains only data written to the storage volume after it was created, previous snapshots may be required to recreate the storage volume. Accordingly, the snapshots of nodes S3 to S1 are needed to create the snapshot of the storage volume corresponding to node B1.

Subsequent principal snapshots of the storage volume will be added as descendants of the node to which the storage volume was rolled back. In the illustrated example, a new principal snapshot is represented by node S6 that is an immediate descendent of node S3. Node S4 is only present due to clone node B1 and therefore may itself be classified as a clone node in the hierarchy in response to the rollback instruction of step 1002.

Note that FIG. 11 is a simple representation of a hierarchy. There could be any number of clone snapshots, clones of clone snapshots and descendent snapshots of any of these snapshots represented by nodes of a hierarchy. Accordingly, to roll back to a particular snapshot of a clone, the method 1000 is the same, except that descendants of the clone snapshot are treated the same as principal snapshots and clones of any of these descendants are treated the same as a clone snapshot.

Figure 12:
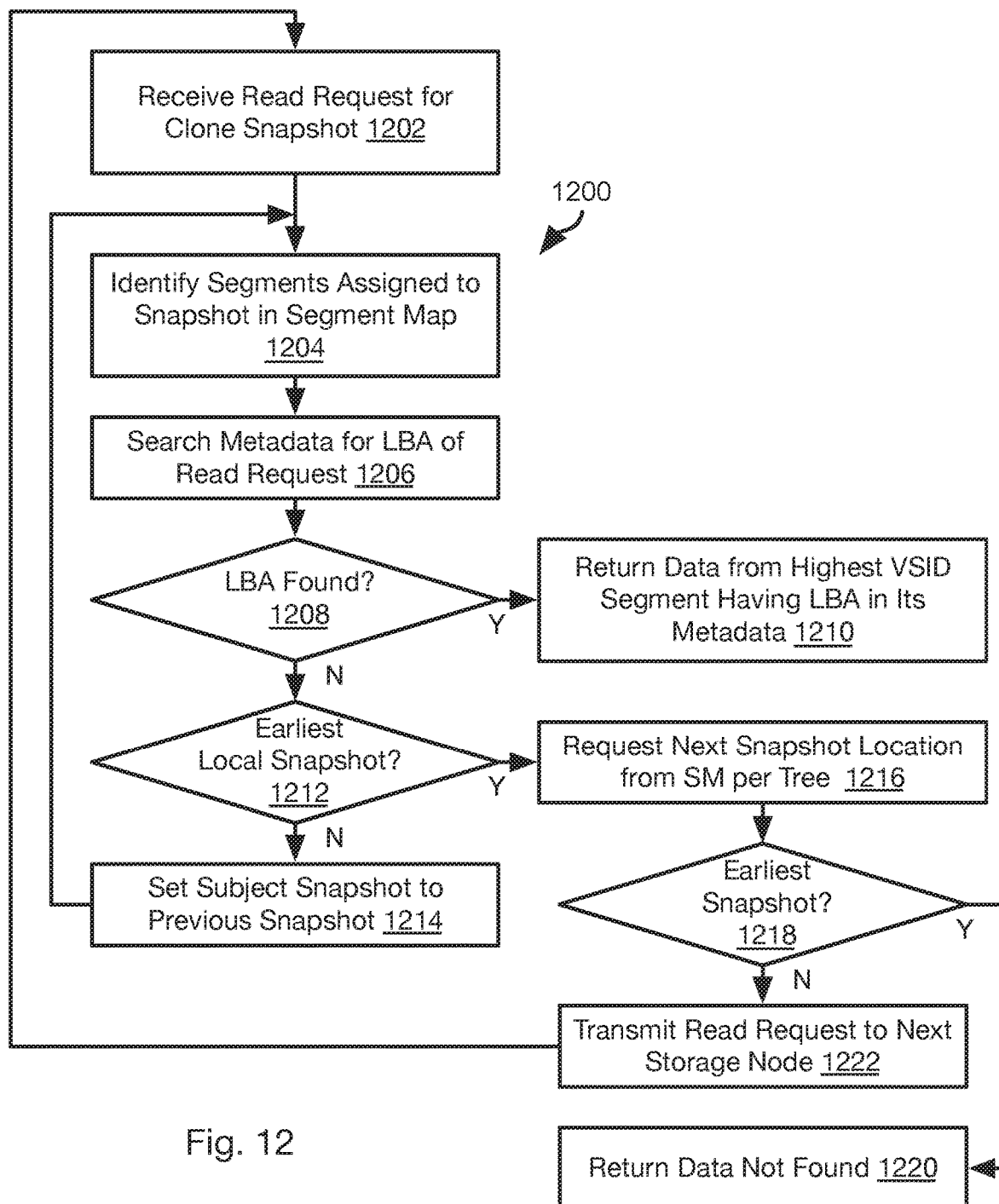
FIG. 12 is a process flow diagram of a method for reading from a clone snapshot in accordance with an embodiment of the present invention.

Referring to FIG. 12, the illustrated method 1200 may be used to execute a read request with respect to a storage volume that is represented by a hierarchy generated as described above with respect to FIGS. 8 through 11. The illustrated method 1200 may also be executed with respect to a storage volume that includes only principal snapshots that are distributed across multiple storage nodes, i.e., all the segments corresponding to snapshots of the same slice of the storage volume are not located on the same storage node 106. In that case, the hierarchy stored on the storage manager 102 stores the location of the segments for each snapshot and therefore enables them to be located.

The method 1200 may be executed by a storage node 106 ("the current storage node") with information retrieved from the storage manager 102 as noted below. The method 1200 may include receiving 1202 a read request, which may include such information as a snapshot ID, volume ID (and/or slice ID), LBA, and size (e.g. number of 4 KB blocks to read).

Note that the read request may be issued by an application executing on a compute node 110. The compute node 110 may determine which storage node 106 to transmit the read request using information from the storage manager 102. For example, the compute node 110 may transmit a request to obtain an identifier for the storage node 102 storing data for a particular slice and snapshot of a storage volume. The storage manager may then obtain an identifier and/or address for the storage node 106 storing that snapshot and slice of the storage volume from the hierarchical representation of the storage volume and return it to the requesting compute node 110. For example, the storage manager 102 may retrieve this information from the node in the hierarchy representing the snapshot included in the read request.

In response to the read request, the current storage node performs the algorithm illustrated by subsequent steps of the method 1200. In particular, the method 1200 may include identifying 1204 segments assigned to the snapshot ID of the read request in the segment ("the subject snapshot").

The method 1200 may include searching 1206 the metadata of the segments identified in step 1204 for the LBA of the read request. If the LBA is found, the data from the highest numbered segment having the LBA in its metadata is returned, i.e. the data that corresponds to the last-written metadata entry including the LBA.

If the LBA is not found in any of the segments mapped to subject snapshot, then the method 1200 may include evaluating 1212 whether the subject snapshot is the earliest snapshot on the current storage node. If not, then steps processing continues at step 1204 with the previous snapshot set 1214 as the subject snapshot.

Steps 1204-1214 may be performed in the same manner as for steps 704-714 of the method 700, including the various modifications and variations described above with respect to the method 700.

In contrast to the method 700, if the LBA is not found in any of the segments corresponding to the subject snapshot for any of the snapshots evaluated, then the method 1200 may include requesting 1216 a location, e.g. storage node identifier, where an earlier snapshot for the volume ID or slice ID is stored. In response to this request, the storage manager 102 determines an identifier of a storage node 106 storing the snapshot corresponding to the immediate ancestor of the earliest snapshot stored on the current storage node in the hierarchy. The storage manager 102 may determine an identifier of the storage node 106 relating to the immediate-ancestor snapshot and that stores data for a slice ID and volume ID of the read request as recorded for the ancestor nearest ancestor node in the hierarchy of the node corresponding to the earliest snapshot stored on the current storage node.

If the current storage node is found 1218 to be the earliest snapshot for the storage volume ID and/or slice ID of the read request, then the data the storage manager 102 may report this fact to the storage node, which will then return 1220 a message indicating that the requested LBA is not available for reading, such as in the same manner as step 714 of the method 700.

If another storage node stores an earlier snapshot for the volume ID and/or slice ID of the read request, then the read request may be transmitted 1222 to this next storage node by either the current storage node or the storage manager 102. The processing may then continue at step 1202 with the next storage node as the current storage node. The read request transmitted at step 1222 may have a snapshot ID set to the latest snapshot ID for the storage volume ID and or slice ID of the original read request.

The method 1200 may be performed repeatedly across multiple storage nodes 106 until the earliest snapshot is encountered or the LBA of the read request is located.

Figure 13:
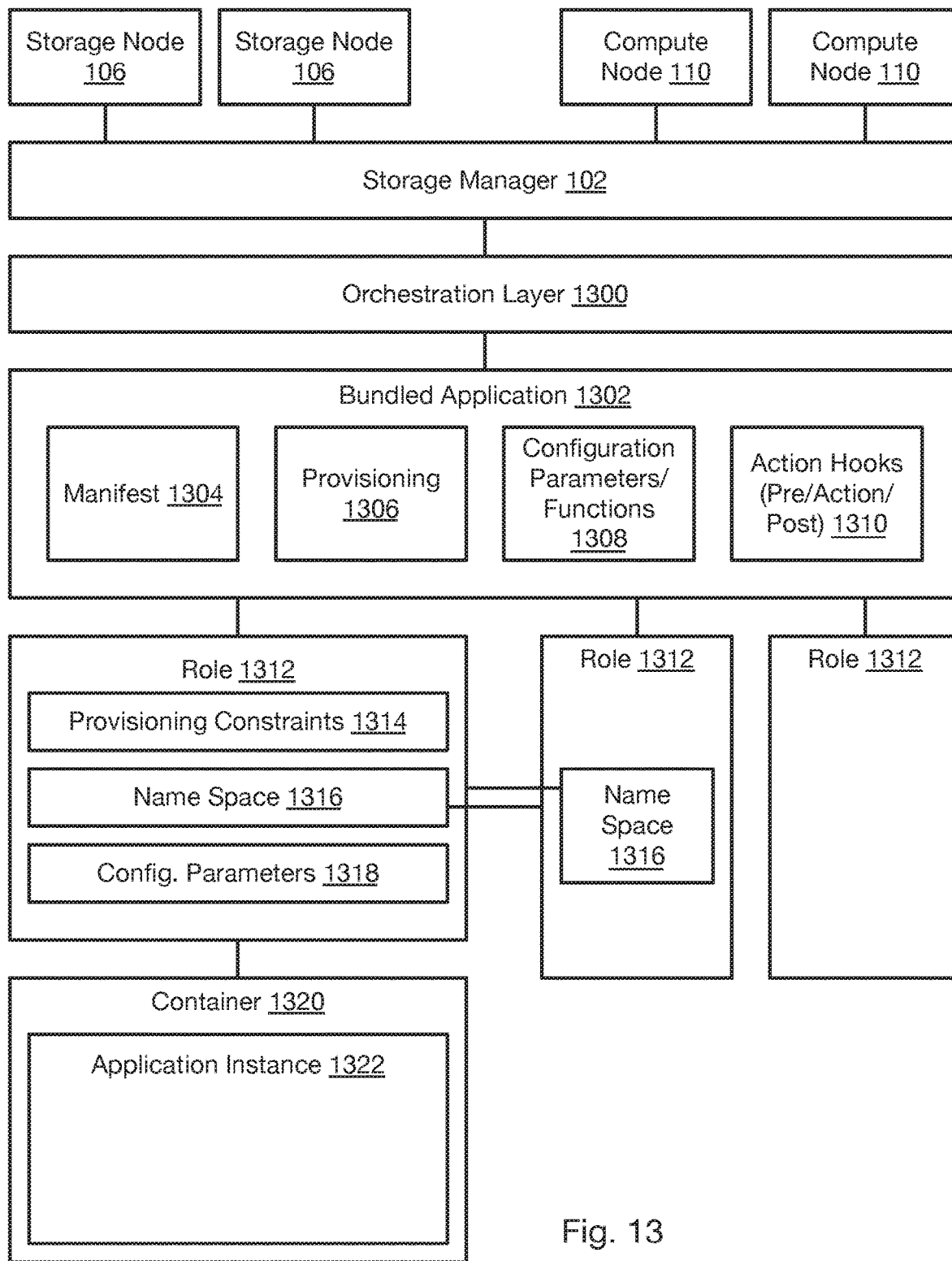
FIG. 13 is a schematic block diagram of components for implementing orchestration of multi-role applications in accordance with an embodiment of the present invention.

Referring to FIG. 13, storage according to the above-described methods and systems may be incorporated into an application-orchestration approach. In the illustrates approach, an orchestration layer 1300 implements a bundled application 1302 including a plurality of roles. In the following description, "bundled application" refers to a bundle of applications as implemented using the orchestration layer. A "role" is an instance of an executable that is managed by the orchestration layer as described herein as part of the bundled application. Accordingly, a "role" may itself be a standalone application, such as a database, webserver, blogging application, or any other application. Examples of roles include the roles used to implement multi-role applications such as CASSANDRA, HADOOP, SPARK, DRUID, SQL database, ORACLE database, MONGODB database, WORDPRESS, and the like. For example, in HADOOP, roles may include one or more of a named node, data node, zookeeper, and AMBARI server.

The orchestration layer 1300 may implement a bundled application 1302 defining roles and relationships between roles as described in greater detail below. The bundled application 1302 may include a manifest 1304 that defines the roles of the bundled application 1302, which may include identifiers of roles and possibly a number of instances for each role identified. The manifest 1304 may define dynamic functions define how the number of instances of particular role may grow or shrink depending on usage. The orchestration layer 1300 may then create or remove instances for a role as described below as indicated by usage and one or more functions for that role. The manifest 1304 may define a topology of the bundled application 1302, i.e. the relationship between roles, such as services of a role that are accessed by another role.

The bundled application 1302 may include provisioning 1306. The provisioning 1306 defines the resources of storage nodes 106 and compute nodes 110 required to implement the bundle. The provisioning 1306 may define resources for the bundle as a whole or for individual roles. Resources may include a number of processors (e.g., processing cores), an amount of memory (e.g., RAM (random access memory), an amount of storage (e.g., GB (gigabytes) on a HDD (Hard Disk Drive) or SSD (Solid State Drive)). As described below, these resources may be provisioned in a virtualized manner such that the bundled application 1302 and individual roles 1312 are not informed of the actual location or processing and storage resources and are relieved from any responsibility for managing such resources. In particular, storage resources may be virtualized by the storage manager 102 using the methods described above such that storage volumes are allocated and used without requiring the bundled application 1302 or roles to manage the underlying storage nodes 106 and storage device 108 on which the data of the storage volumes is written.

Provisioning 1306 may include static specification of resources and may also include dynamic provisioning functions that will invoke allocation of resources in response to usage of the bundled application. For example, as a database fills up, additional storage volumes may be allocated. As usage of a bundled application increases, additional processing cores and memory may be allocated to reduce latency.

A bundled application 1302 may further include configuration parameters 1308. Configuration parameters may include variables and settings for each role of the bundle. The configuration parameters are defined by the developer of the role and therefore may include any example of such parameters for any application known in the art. The configuration parameters may be dynamic or static. For example, some parameters may be dependent on resources such as an amount of memory, processing cores, or storage. Accordingly, these parameters may be defined as a function of these resources. The orchestration layer will then update such parameters according to the function in response to changes in provisioning of those resources that are inputs to the function. For example, CASSANDRA defines a variable Max_Heap_Size that is normally set to half the memory limit. Accordingly, as the memory provisioned for a CASSANDRA role increases, the value of Max_Heap_Size may be increased to half the increased memory.

The bundled application 1302 may further include action hooks 1310 for various actions that may be taken with respect to the bundled application and/or particular roles of the bundled applications. Actions may include some or all of stopping, starting, restarting, taking snapshots, cloning, and rolling back to a prior snapshot. For each action, one or more action hooks may be defined. A hook is a programmable routine that is executed by the orchestration layer when the corresponding action is invoked. A hook may specify a script of commands or configuration parameters input to one or more roles in a particular order. Hooks for an action may include a pre-action hook (executed prior to implementing an action), an action hook (executed to actually implement the action), and a post action hook (executed following implementation of the action).

The bundled application 1302 may define a plurality of roles 1312. Each role may include one or more provisioning constraints. As noted above, the bundled application 1302 and roles 1312 are not aware of the underlying storage nodes 106 and compute nodes 110 inasmuch as these are virtualized by the storage manager 102 and orchestration layer 1300. Accordingly, any constraints on allocation of hardware resources may be included in the provisioning constraints 1314. As described in greater detail below, this may include constraints to create separate fault domains in order to implement redundancy and constraints on latency.

The role 1312 may define a name space 1316. A name space 1316 may include variables, functions, services, and the like implemented by a role. In particular, interfaces and services exposed by a role may be included in the name space. The name space may be referenced through the orchestration layer 1300 by an addressing scheme, e.g. <Bundle ID>.<Role ID>.<Name>. In some embodiments, references to the namespace 1316 of another role may be formatted and processed according to the JINJA template engine or some other syntax. Accordingly, each role 1312 may access the variables, functions, services, etc. in the name space 1316 of another role 1312 on order to implement a complex application topology. In some instances, credentials for authorizing access to a role 1312 may be shared by accessing the namespace 1316 of that role.

A role 1312 may further include various configuration parameters 1318 defined by the role, i.e. as defined by the developer that created the executable for the role. As noted above, these parameters 1318 may be set by the orchestration layer 1300 according to the static or dynamic configuration parameters 1308. Configuration parameters may also be referenced in the name space 1316 and be accessible (for reading and/or writing) by other roles 1312.

Each role 1312 may include a container 1320 executing an instance 1322 of the application for that role. The container 1320 may be a virtualization container, such as a virtual machine, that defines a context within which the application instance 1322 executes, facilitating starting, stopping, restarting, and other management of the execution of the application instance 1322. Containers 1320 may include any container technology known in the art such as DOCKER, LXC, LCS, KVM, or the like. In a particular bundled application 1302, there may be containers 1320 of multiple different types in order to take advantage of a particular container's capabilities to execute a particular role 1312. For example, one role 1312 of a bundled application 1302 may execute a DOCKER container 1320 and another role 1312 of the same bundled application 1302 may execute an LCS container 1320.

Note that a bundled application 1302 as configured in the foregoing description may be instantiated and used or may be saved as a template that can be used and modified later.

Figure 14:
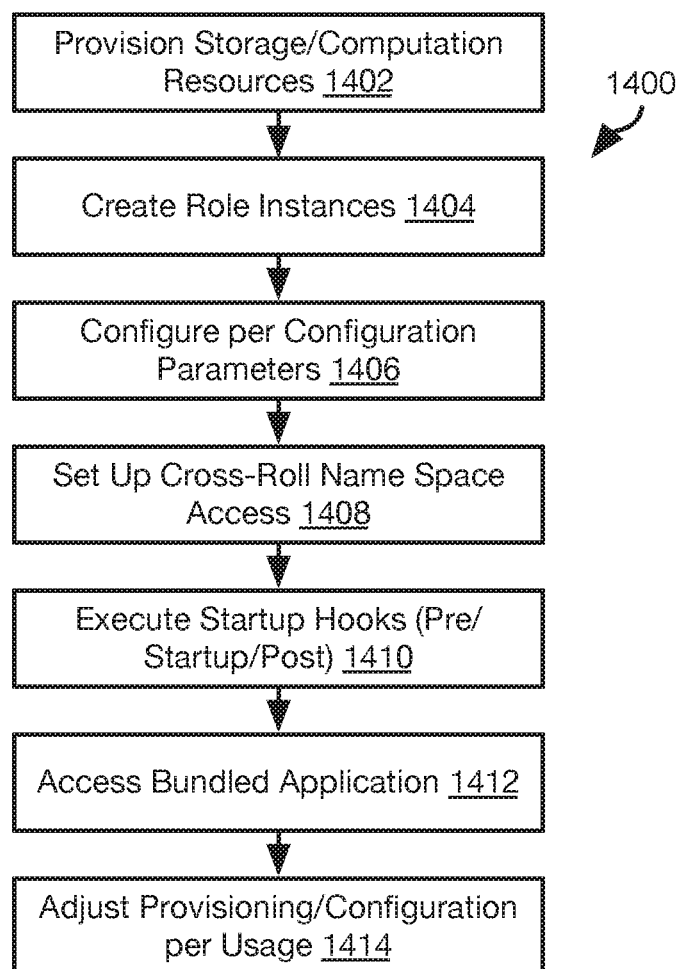
FIG. 14 is a process flow diagram of a method for orchestrating the deployment of a multi-role application in accordance with an embodiment of the present invention.

FIG. 14 illustrates a method 1400 for executing a bundled application 1302 using the orchestration layer 1300. The method 1400 may include provisioning 1402 storage and computation resources according to the provisioning 1306. This may include allocating storage volumes according to the storage requirements, assigning the storage volumes to storage nodes 106, and selecting a compute node 110 or storage node 106 providing the required computational resources (processor cores and memory).

The method 1400 may include creating 1404 role instances for the roles 1312 defined by the bundled application 1302. As described above, this may include creating a container 1320 and instantiating the application instance 1322 of the role 1312 within the container 1320. The order in which instances 1322 are created and started may be defined in the manifest 1304.

The method 1400 may include configuring 1406 each role according to the configuration parameters 1308, including executing any included functions to determine values for dynamic parameters. As noted above, starting a bundled application 1302 may further include setting up 1408 the roles 1312 to reference resources in the name space 1316 of another role 1312. For example, a webserver may be configured to access a database by referencing configuration parameters and services implemented by the database.

The method 1400 may further include executing 1410 any hooks 1310 defined for the initial startup of the bundled applications. Accordingly, pre-startup, startup, and post startup hooks may be executed. Some or all of the functions of steps 1402-1410 may be defined as part of the pre-startup hook. Other functions may also be performed prior to steps 1402-1408 as defined by a pre-startup hook.

The actual commencement of execution of the instances 1322 of the bundled application 1302 may be performed in an order specified by the startup hook and may include performing any attendant functions of these instances 1322 as specified by the startup hook. Following startup, one or more other actions may be performed as specified by the developer in the post-startup hook. These actions may invoke functions of the instances 1322 themselves or executed by the orchestration layer 1300 outside of the instances 1322, such as with respect to an operating system executing the containers 1320 for the instances 1322.

The bundled application 1302 may then be accessed 1412 in order to perform the programmed functionality of the application instances 1322. As usage occurs, processing resources will be loaded and storage may be filled. The method 1400 may further include adjusting 1414 provisioning according to this usage and may performed adjustment to configuration parameters of the roles 1312 according to this provisioning as defined by the provisioning 1306 and configuration functions 1308.

As noted above, instances of roles may also be created or removed according to usage. Accordingly, where indicate by the manifest 1304, instances 1322 for a role 1312 may be created according to steps 1402-1410 throughout execution of the bundled application 1302 as defined by one or more dynamic functions in the manifest 1304 for that role 1312.

Figure 15:
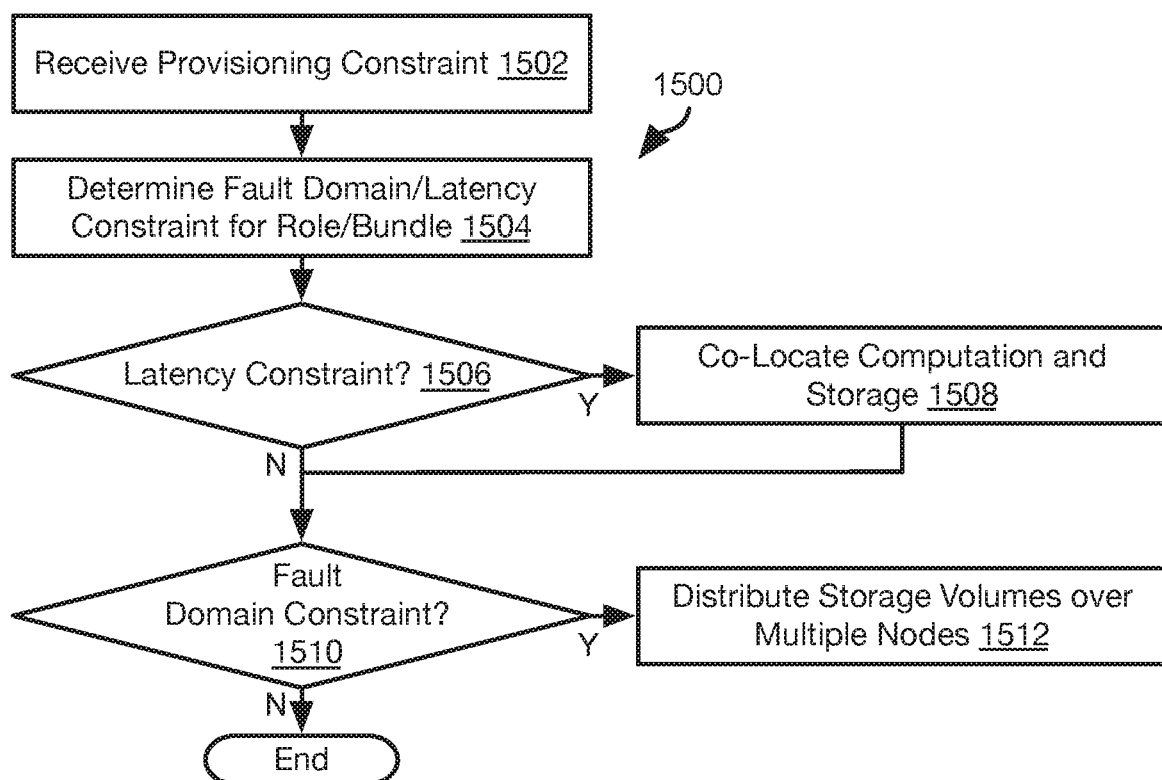
FIG. 15 is a process flow diagram of a method for implementing provisioning constraints in accordance with an embodiment of the present invention.

Referring to FIG. 15, the illustrated method 1500 may be used to implement provisioning constraints 1314 for a role 1312 or constraints for an entire bundled application 1302. The method 1500 may be executed by the orchestration layer 1300, storage manager 102, or a combination of the two.

The method 1500 may include receiving 1502 the provisioning constraint 1314 for one or more roles 1312 of the bundled application 1302 and determining 1504 whether the constraint 1314 specify one or both of a fault domain constraint and a latency constraint.

If a latency constraint is found 1506 to be included for a role 1312, then computational resources and storage resources to be provisioned for the role 1312 may be constrained 1508 to be co-located. In particular, latency may be specified in terms of (a) a minimum network delay, (b) a minimum network throughput, (c) an explicit constraint to place computation and storage resources in the same subnetwork, or (d) an explicit constraint to place computation and storage resources on the same node, i.e. a hybrid compute and storage node 110, 106 that performs the functions of both types of nodes with a single computer.

This constraint may be used by the orchestration layer to assign computing and storage resources to roles 1312 and storage volumes of the bundled application. For example, one or more storage volumes for the role 1312 will be assigned to storage nodes 106 that can either (a) meet the latency requirement with respect to compute nodes 110 allocated to the role 1312 (b) also provide the computational resources required for the role 1312.

The orchestration layer 1300 may include a resource manager in that accounts for all of the compute storage requirements and constraints and creates a resource allocation plan. This plan describes the virtual nodes (containers 1320) that make up the bundled application 1302. Each virtual node has allocations of processor cores, memory and storage volumes. The resource manager determines the compute host (compute node 110 or hybrid node) for each virtual node and a set of devices for each storage volume of the virtual node. The orchestration layer 1300 sends this mapping of the storage volumes to physical devices to the storage manager 102, which implements the storage allocation.

If the constraint for a role 1312 is found 1510 to include a fault domain constraint, then storage volumes for the role 1312 may be distributed 1512 among the storage nodes 106 of the distributed storage system 100 according to this requirement. For example, if storage volume B is a redundant (e.g., replica or backup) copy of storage volume A, the fault domain constraint may indicate this fact. Accordingly, the storage manager 102 may assign storage volume B to a different storage node 106 than storage volume A. Various degrees of constraint may be specified. For example, a fault domain constraint may simply require a different storage device 108 but not require a different storage node 106. A fault domain constraint may require that storage nodes 106 to which storage volumes are assigned by in separate subnetworks, different geographic locations, or have some other degree of separation. Similar fault domain constraints may be specified for roles 1312, which may be constrained to execute on different compute nodes 110 in order to provide redundant services and reduce downtime.

The provisioning constraints 1502 based on fault domains and/or latency may be combined with one or more other constraints. For example, a performance constraint (IOPs/second) for a storage node may be imposed. Accordingly, only those compute nodes meeting the performance requirement and the fault domain and/or latency requirements will be selected for provisioning.

As noted above, provisioning 1306 may define a processing requirement, such as a number of processing cores and an amount of storage for a role. Accordingly, compute nodes 110 may be selected at step 1508 such that both the latency requirement and processing requirement are met.

Figure 16:
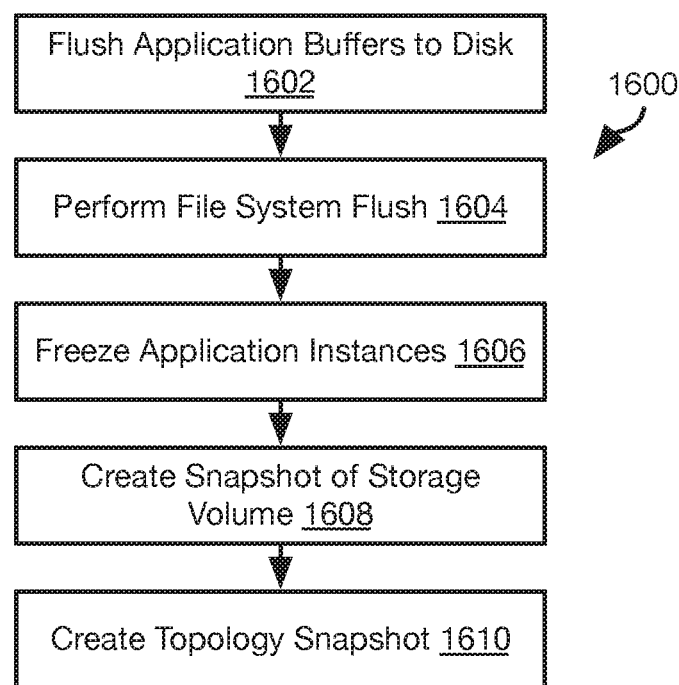
FIG. 16 is a process flow diagram of a method for creating a snapshot of a multi-role application in accordance with an embodiment of the present invention.

Referring to FIG. 16, the illustrated method 1600 may be executed by the orchestration layer 1302 with respect to a bundled application 1302 in order to create a snapshot of the bundled application 1302 that can be later restored (see the method 1700 of FIG. 17).

The method 1600 may include flushing 1602 application buffers to disk. In many instances, performance of an application is accelerated by maintaining data in a cache in memory, such that data in the cache is accessed and updated without requiring writing to a disk in many instances, as known in the art. Accordingly, this buffer may be flushed 1602 to disk by writing all valid data (i.e., not outdated due to a subsequent write) in the cache to the storage device 108 to which that data is addressed, e.g., to which the storage volume referenced by the data is assigned.

In a like manner, a file system flush may be performed 1604. Performing a file system flush may include ensuring that all IOPs pending to be performed by the file system have been executed, i.e. written to disk. As for step 1602, data written to a cache for the file system this is valid may be written to a storage device 108 to which the data is addressed, e.g., to which the storage volume referenced by the data is assigned.

The method 1600 may then include freezing 1606 the application instances 1322 of each role 1312. In particular, inasmuch as each instance 1322 is executing within container 1320, the containers 1320 for the roles 1312 may be instructed to pause execution of each instance 1322. This may include stopping execution and saving a state of execution of each instance 1322 (state variables, register contents, program pointers, function stack, etc.).

The method 1600 may further include creating 1608 a snapshot of storage volumes provisioned for the bundled application. This may include executing the method 200 of FIG. 2 or any of the above-described approaches for implementing a snapshot of a storage volume.

The method 1600 may further include creating 1610 a topology snapshot for the bundled application 1302. The topology of an application may include some or all of the following information as constituted at the time of executing step 1610 a listing of the roles 1312, which may include one or more instances 1322 of the same role 1322, relationships between application instances 1322 of roles 1312 (name space cross-references, configuration parameters), storage volumes assigned to roles 1312, or other information that describes the topology of the bundled application 1302. Applications may create metadata describing their state of operation. This data may also be saved as part of the topology snapshot.

After the snapshot is created according to the method 1600, the application instances may be resumed, with the application itself not suffering any down time in some embodiments. The bundled application 1302 may then continue to operate. If desired, the application may then be rolled back to the snapshot created according to the method 1600, as described below with respect to FIG. 17.

Figure 17:
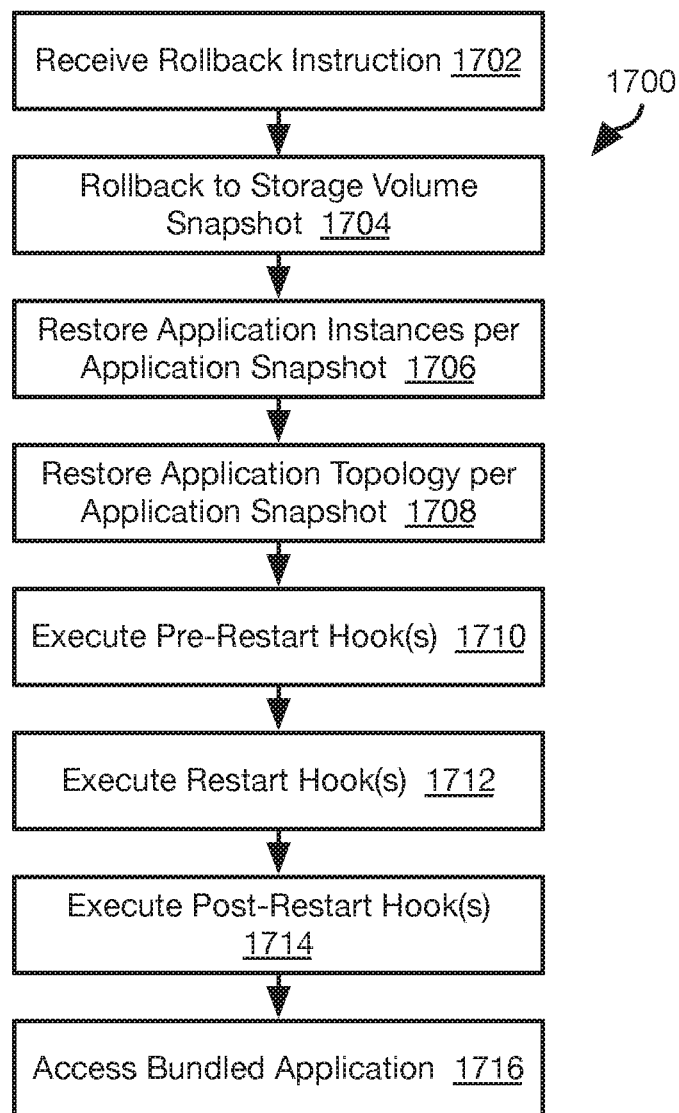
FIG. 17 is a process flow diagram of a method for rolling back a multi-role application in accordance with an embodiment of the present invention.

FIG. 17 illustrates a method 1700 for rolling back a bundled application 1302 to a snapshot, such as a snapshot created according to the method 1600. The method 1700 may be executed by one or both of the orchestration layer 1300 and the storage manager 102.

The method 1700 includes receiving 1702 a rollback instruction, such as from an administrator desiring to return to a stable version of the bundled application 1302. The remaining steps of the method 1300 may be executed in response to the rollback instruction.

The method 1700 may include rolling 1704 back storage volumes assigned to the bundled application 1302 to the snapshots created for the snapshot of the bundled application 1302 (e.g., at step 1608 of the method 1600). This may include executing the method 1000 of FIG. 10 or performing any other approach for rolling back a storage volume to a prior state.

The method 1700 may include restoring 1706 application instances from the application snapshot. As described above with respect to step 1606 of the method 1600, an application instance 1322 may be frozen. Accordingly, data describing a state of execution of the application instance 1322 may be reloaded into a container 1302 for that instance. If needed, the container for that application instance 1322 may be created and the instance 1322 loaded into it prior to loading the state of execution. This is particularly the case where the number of application instances has changed since the application snapshot was created.

The method 1700 may further include restoring 1708 the application topology saved for the bundled application at step 1610. Accordingly, relationships between application instances 1322 of roles 1312 (name space cross-references, configuration parameters), storage volumes assigned to roles 1312, or other information that describes the topology of the bundled application 1302 may be restored as it was at the time the application snapshot was created The method 1700 further include executing 1710, 1712, 1714 a pre-restart hook, restart hook, and post restart hook defined for the bundled application. As described above, each hook may be a routine defined by a developer to be executed for a particular action, restarting in this case. In step 1712, execution of the instances 1322 for the roles 1322 may be restarted, along with any other actions specified by the developer in the restart hook.

The bundled application 1302 as restored at steps 1704-1714 may then be accessed 1716 as defined by the programming of the application instances and the restored application topology.

Note that the snapshot of the bundled application 1302 may be restarted on different storage and compute nodes 106, 110 than those on which the bundled application 1302 was executing when the snapshot was created. Accordingly, the application snapshot may be restarted as a clone of the bundled application 1302 or moved to different hardware when executing the method 1700.

In some instances, the hooks of steps 1710, 1712, 1714 may be different when the application snapshot is being restarted as a clone as desired by a developer. For example, a developer may desire to scale the clone application to increase or decrease a number of databases, number of partitions of a database, or other aspect of the clone application. Accordingly, the hooks of steps 1710, 1712, 1714 may implement routines to implement this increase or decrease.

For example, some applications are able to automatically detect the number of partitions of a database. In such instances, some or all of the hooks 1710, 1712, 1714 may reduce the number of partitions in a database of the clone applications and rely on the application to discover this change. In other instances, some or all of the hooks 1710, 1712, 1714 may be programmed to configure an application to access the database with the reduced number of partitions where the application is unable to configure itself.

Figure 18A:
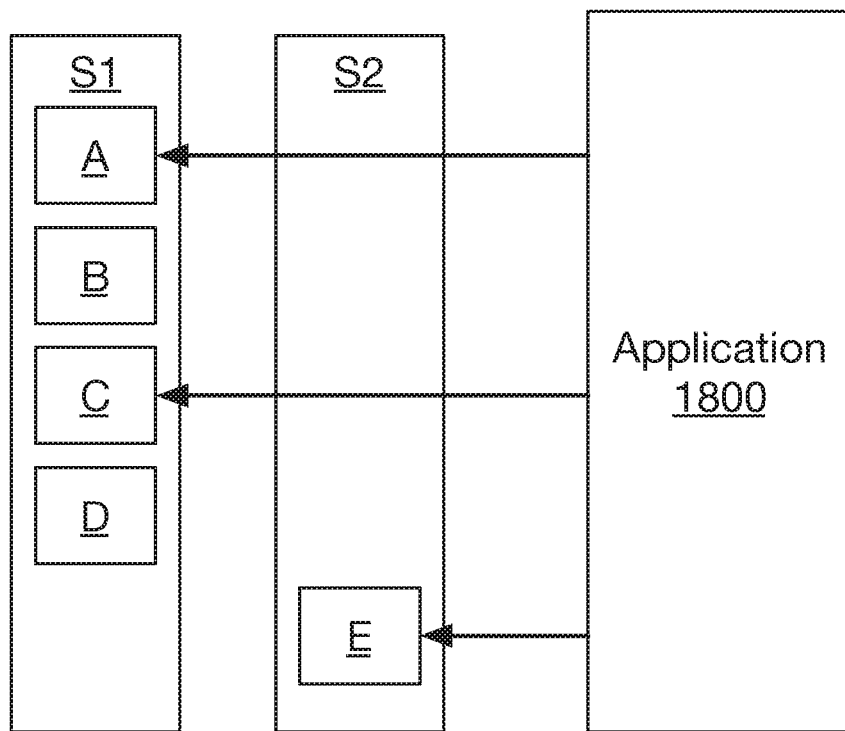
FIG. 18A is a diagram illustrating a thin clone in accordance with an embodiment of the present invention.
Figure 18B:
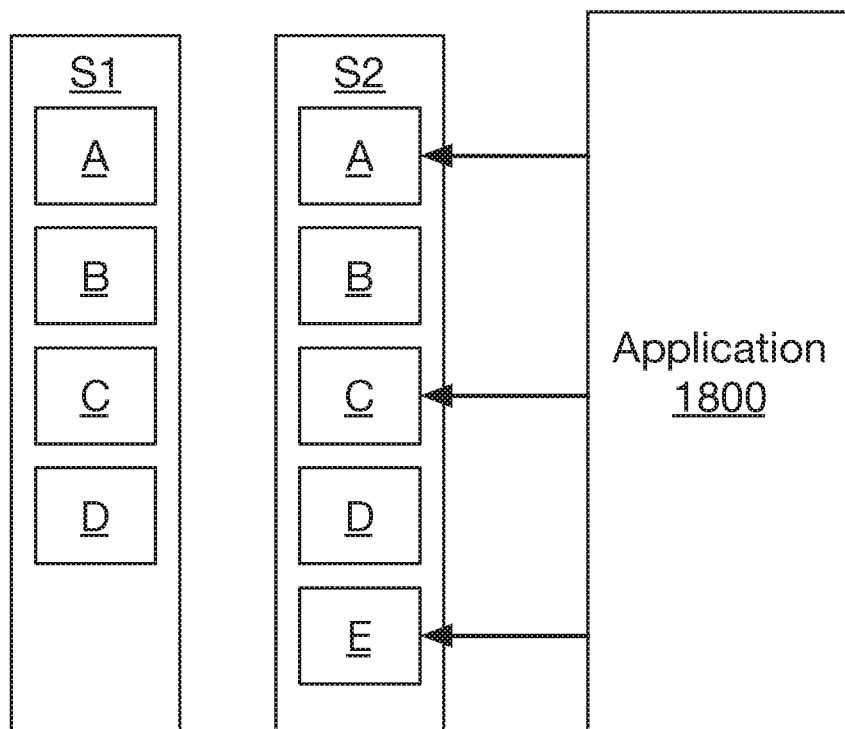
FIG. 18B is a diagram illustrating a thick clone in accordance with an embodiment of the present invention.

Referring to FIGS. 18A and 18B, a storage volume may be cloned in the form of a clone snapshot, such as according to the approach described above with respect to FIGS. 8 through 12.

FIG. 18A illustrates the approach of FIGS. 8 through 12, which is referred to herein as a "thin" clone. In this approach, a segment E allocated to the clone snapshot S2 after creation of the clone snapshot is written only to the clone snapshot. Segments A-D that were written to snapshot S1 prior to creation of clone snapshot S2 are not copied to snapshot S1. As noted above, snapshot S2 may be on a different storage node than snapshot S1. As described above with respect to FIG. 12, reads from an application 1800 for segments A-D will therefore be routed to the storage node storing snapshot S1. Reads for segment E can be processed locally.

This results in increase latency for these reads and increases loading of the storage node 106 storing snapshot S1. In the case where snapshot S1 is a production snapshot and snapshot S2 is only for testing, this loading may be undesirable. However, copying the segments A-D to snapshot S2 will also result in loading of the storage node 106 storing snapshot S1.

FIG. 18B illustrates a "thick" clone wherein the segments A-D are copied to snapshot S2. In this manner, all reads are handled by the storage node 106 storing the snapshot S2 and the production storage node 106 storing S1 is not loaded. However, the process of copying the segments A-D to snapshot S2 will also result in loading of the storage node 106 storing snapshot S1.

Figure 19:
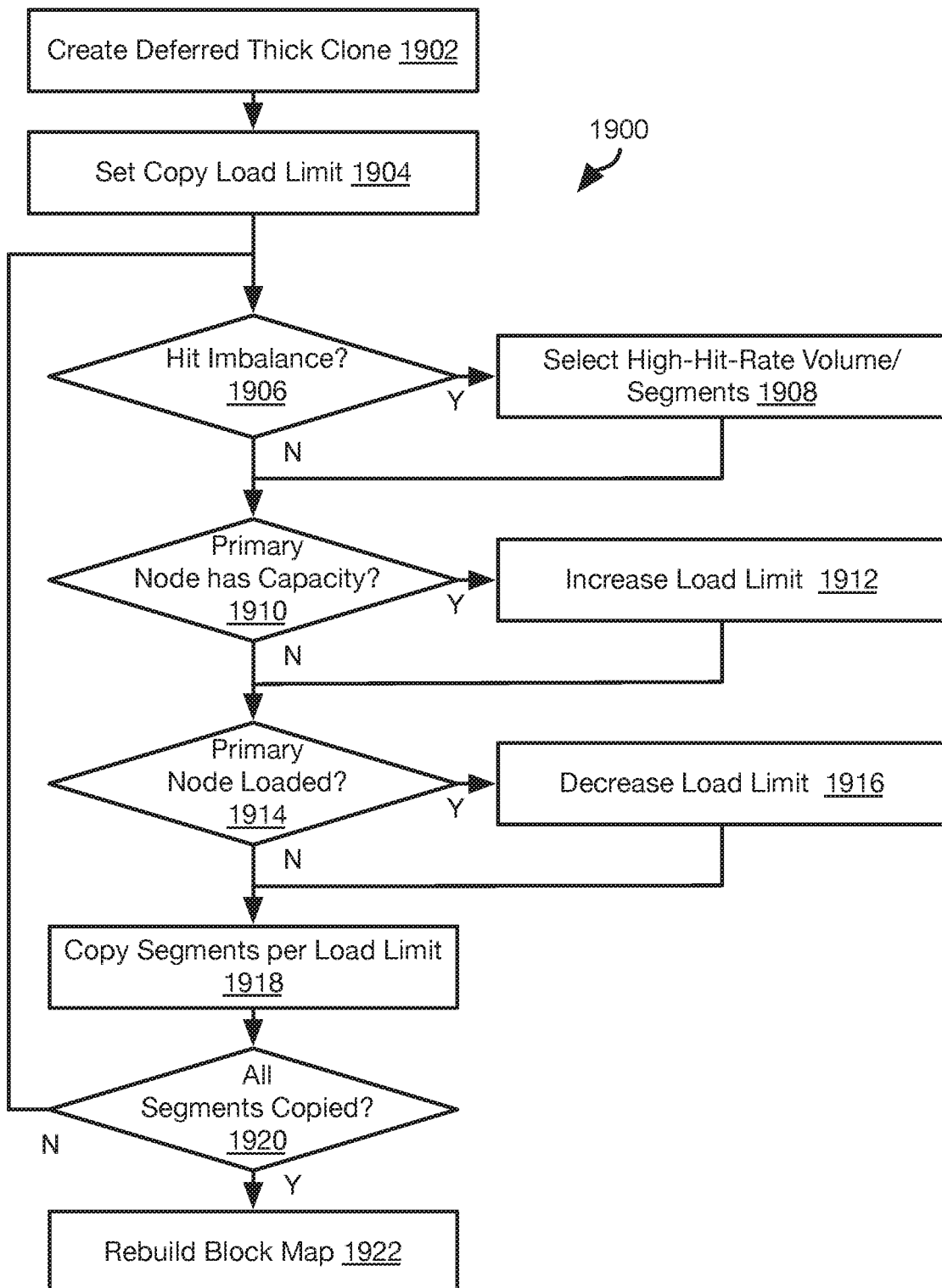
FIG. 19 is a process flow diagram of a method for implementing a deferred thick clone in accordance with an embodiment of the present invention.

FIG. 19 illustrates a method 1900 for implementing a "deferred thick clone" snapshot wherein segments of snapshot S1 are gradually copied to snapshot S2 while avoiding impacting performance of the production storage node 106 storing snapshot S1. The method 1900 may be executed by the storage node 106 storing the snapshot S2 ("the clone node") in cooperation with the storage node 106 storing the snapshot S1 ("the primary node"). The segments that are copied may have corresponding VSIDs as described above with respect to FIG. 3. The association of a VSID to a segment may maintained for the copy of the segment on the clone node. As described above, a storage volume may be divided into slices that may reside on different storage nodes 106. Accordingly, the method 1900 may be executed separately for each slice of the storage volume.

The method 1900 may include creating 1902 a deferred thick clone snapshot. This may include creating a thin clone snapshot (FIG. 8, FIG. 18A) S2. Creating 1902 a deferred thick clone snapshot may include allocating physical segments 324 and corresponding PSIDs 316 for each segment to be copied, such as prior to the segments being copied. In some embodiments, a user may instruct that a pre-existing thin clone snapshot is to be converted to a deferred thick clone snapshot according to the method 1900.

The segment map 314 may be updated to include the slice ID 310 (mapped to offset within cloned storage volume per slice map 308), and VSID 318, and possibly other information shown in FIG. 3, for each segment to be copied. The snapshot ID 340 in the segment map 340 may be set equal to S2, i.e. the snapshot identifier for the clone snapshot. The segment map 314 may be updated either prior to copying or each PSID 316 entry may be updated when the corresponding segment is copied to the physical segment 324 for that PSID 316.

The method 1900 may include setting 1904 a load limit, e.g., a limit on how much copying traffic the clone node may impose on the primary node. The load limit may be specified in terms of a number of bytes per second, a number of segments that may be copied at any one time, or other limits. The load limit may be time dependent. For example, at night or other periods of low usage, the load limit may be raised since production usage of the clone node will not be significantly impaired.

The load limit may also specify a maximum number of read IOPs that may be requested from the primary node in a given time period, e.g., maximum IOPs/second limit.

The method 1900 may include evaluating 1906 whether there is a hit imbalance for any of the segments that remain to be copied from the primary node to the clone node. In particular, if a large number of read requests are being routed to the primary node for a particular segment, then copying of that segment will reduce loading of the primary node and reduce latency for the clone node.

Accordingly, reads routed to the primary node may be tabulated for each segment referenced. Copying of segments may then be ordered according to the number of reads, with a segment having a higher number of reads being copied before a segment with a lower number. Where N segments may be in process of being copied simultaneously, then the N segments with the N highest read counts may be selected 1908 for copying first. Where no read imbalance exists, e.g., there is no significant difference in the number of reads per segment, the segments may be copied in order, e.g. in order of increasing VSIDs. What is significant may be a predetermined value. For example, where the highest read count is less than X percent of the average read count, the imbalance may be deemed insignificant, where X is a value between 1.1 and 2 or some other predetermined value greater than one.

In some instances, heavily used storage volumes and segments of a storage volume may be known by a developer based on the application topology, e.g., log files with heavy write usage and low read usage may be copied last whereas heavily read data may be read first. Accordingly, the ordering of copying of segments may be specified by a developer in order to copy those segments with a high hit rate first.

The method 1900 may include evaluating 1910 whether the primary node 1910 has spare capacity. For example, the primary node 1910 may transmit loading information, e.g. IOPs per second, to the clone node. For example, where this loading falls below a predetermined threshold, e.g. less than Y percent of the total IOP/second capacity of the primary node, then the load limit for copying segments may be increased 1912, where Y is predetermined value less than 100, such as 70. The amount of the load limit may be set to some predetermined function of the unused IOP/second capacity of the primary node, e.g. such that no more than Z percent of the capacity is used, such as Z=90 percent.

In a like manner, if the primary node is determined 1914 to be loaded, the load limit may be decreased, e.g. decreased such that the amount of unused capacity of the primary remains below an acceptable value, e.g., such that the load limit plus production loading of the primary node is less than Z percent.

Note that steps 1910-1916 may be performed at the storage device 108 level. Accordingly, loading of a storage device 108 is evaluated 1910, 1914 and the load limit increased 1912 or decreased 1916 based on the loading in the same manner described above.

Note also that the evaluations of steps 1906, 1910, 1914 may be performed at the container 1320 level. In particular, storage volumes allocated to instances 1322 that are generating higher read traffic relative to other instances 1322 may be copied before storage volumes allocated to the other instances 1322.

Copying of segments according to the load limit may be performed 1918. Steps 1906-1918 may be performed repeatedly until all segments are found 1920 to have been copied.

With reference to FIG. 3, Once all segments are copied the block map 338 may be rebuilt 1922 according to the copied segments. In particular, metadata (e.g., index pages 328) of the copied segments may be evaluated to determine the physical offset 334 of LBAs referenced in the copied segments. The entry for each LBA may then be updated to include the PSID 316 where the copied segments was written and the physical offset 334 for that LBA. As noted above, a block map 338 may be maintained for each slice of a logical storage volume. Accordingly, updating 1922 the block map may be performed for each slice referenced by the copied segments.

As noted above, the block map 338 indicates the location of the latest written data addressed to an LBA. Accordingly, references to an LBA 332 in a copied segment will not cause updating of the entry in the block map 338 for that LBA 332 where a later version of data has been written to that LBA 332.

For example, where a copied segment referencing an LBA 332 has a lower VSID than the VSID 318 mapped to the PSID 316 in the block map for that LBA 332, the entry for that LBA 332 in the block map 338 will not be updated for that copied segment.

The method 1900 may be performed in the context of cloning a bundled application 1302. Accordingly, the rollback method of FIG. 17 may be performed on different hardware then that on which the bundled application 1302 was executing when an application snapshot was created in order to create a clone of the bundled application. In such instances, storage volumes may be cloned as either thin clones, thick clones, or deferred thick clones. The clone application may therefore continue to access storage nodes 106 provisioned for the original bundled application 1302 until a deferred thick clone has completed copying of data from the original bundled application.

Figure 20:
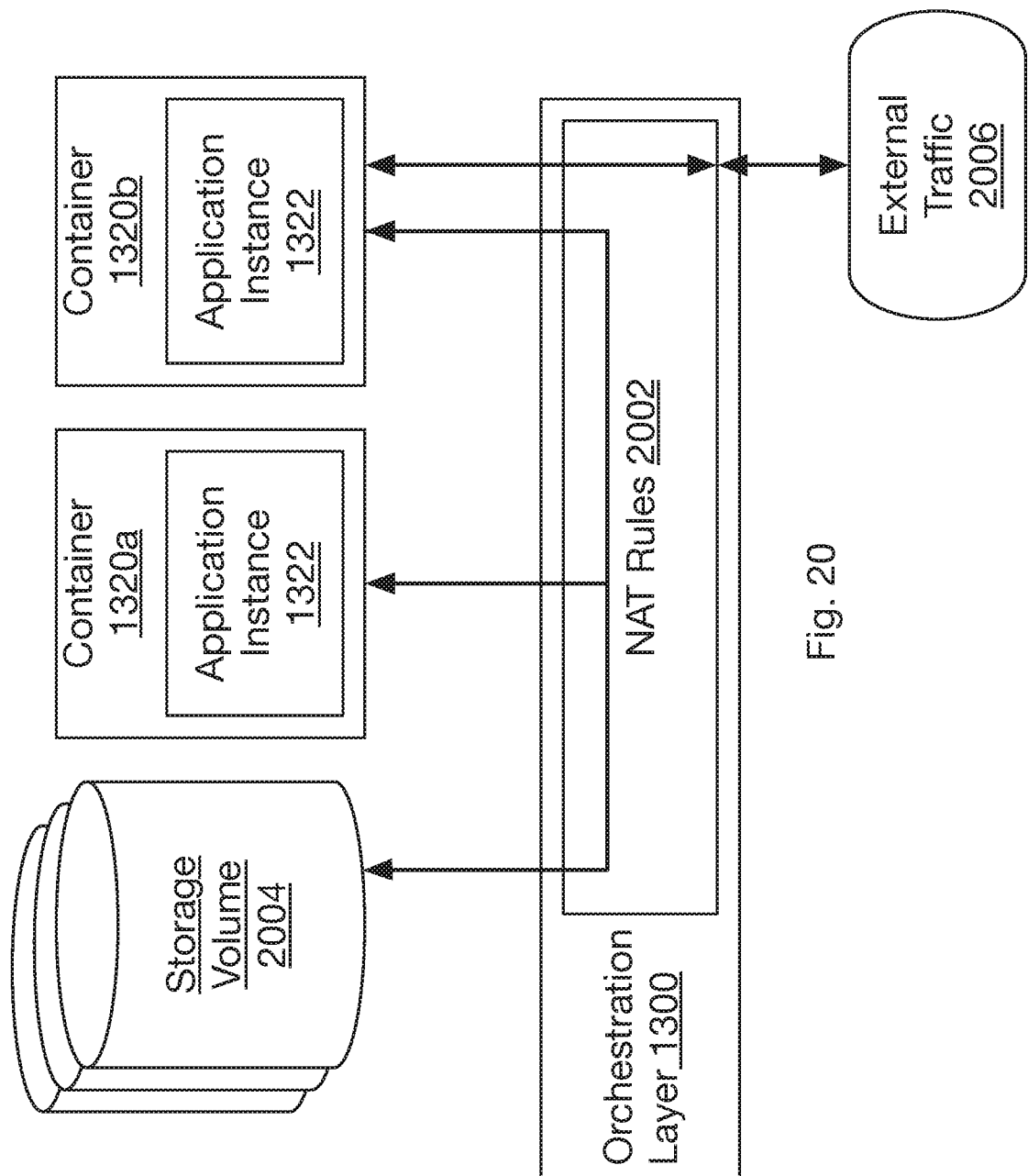
FIG. 20 is a diagram illustrating implantation of a fenced application clone in accordance with an embodiment of the present invention.

Referring to FIG. 20, a plurality of containers 1320a-1320b of a bundled application 1302 hay have addresses assigned thereto that uniquely identify them. These addresses may be different and independent from the addresses (e.g., Internet Protocol (IP) addresses) of compute nodes 110 or hybrid nodes executing the containers 1320a-1320b. In the simplified illustration, there are only two containers 1320a-1320b. In some applications there may be tens or even hundreds of containers 1320a-1320b each with a corresponding container address.

Traffic between containers 1320a-1320b may be routed according to the addresses thereof, such as according to the approach described below with respect to FIG. 22. The orchestration layer 1300 may configure or implement network address translation (NAT) rules 2002 that may route packets addressed to a container based on references to the address of the container in the packets.

The containers 1320a-1320b may have one or more storage volumes 2004 mounted thereto. As described hereinabove, storage volumes may correspond to storage devices 108 on a different computer, such as on a remote storage node 106. Accordingly, read and write requests may be routed to the corresponding storage node 106, such as according to NAT rules 2002.

In many bundled applications, particularly HADOOP, there are many containers 1320a-1320b executing many roles and many instances of roles. Persistent data stored in the storage volumes 2004 of the containers 1320a-1320b may reference the addresses of one or more of the containers 1320a-1320b. These addresses may be stored throughout persistent data for the containers 1320a-1320b and precise knowledge of the operation of the bundled application may be required to determine where they occur.

When the bundled application is cloned (see discussion of FIG. 17), the storage volumes 2004 may also be cloned, including references to the original addresses of the containers 1320a-1320b of the original application. However, the containers 1320a-1320b of the clone may be assigned new addresses to enable distinguishing between the containers 1320a-1320b of the original application and the containers 1320a-1320b of the cloned application. These new addresses are used to route external traffic 2006 to and from the containers 1320a, 1320b.

Figure 21:
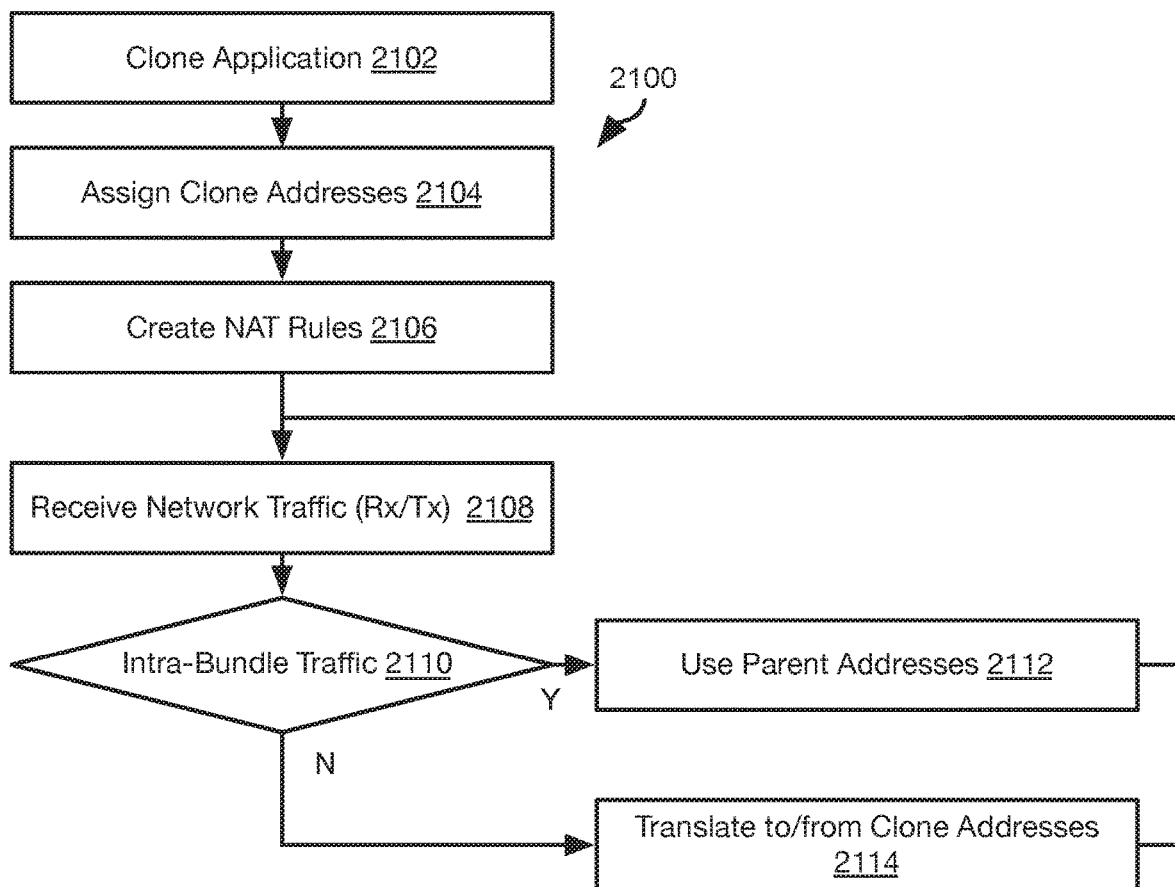
FIG. 21 is a process flow diagram of a method for implementing a fenced application clone in accordance with an embodiment of the present invention.

FIG. 21 illustrates a method that may be used to deal with this situation. The method 2100 may include cloning 2102 an application, such as in the manner described above in the discussion of FIG. 17. The method 2100 may presume that the original application continues operating. Where an application is simply moved, execution of the method 2100 may be omitted.

The method 2100 may include assigning 2104 new addresses to the containers 1320a-1320b of the clone application and creating 2106 NAT rules. The NAT rules may map the address for a container 1320*a* in the clone application to the address for the corresponding container 1320*a* in the parent application. A clone application may reproduce the topology of the parent application. Accordingly, each clone container may have a mapping in the NAT rules between the address of the each clone container and the address of the container of the parent application to which it corresponds in the topology and of which it the each clone container is a clone.

The NAT rules may further include an association among the addresses of the clone containers, i.e. an indication that all of the addresses of the clone containers belong to the same bundled application.

The method 2100 may further include receiving 2108 network traffic that is either directed or received from a container 1320*a*, 1320*b* of the clone application. The network traffic may be received by a network component programmed with the NAT rules of step 2106, which may be a router, switch, firewall, or other network component and may be the same or different from the computer system implementing the orchestration layer 1300. This network component may perform the remaining steps of the method 2100.

If the traffic is found 2110 to be intra-bundle traffic, then the traffic is routed to a container 1320*a*, 1320*b* of the clone application using 2112 the same address as the parent application. Specifically, communication between containers of the clone application may use the same addresses as the parent application and be routed to the containers of the clone application corresponding to these addresses.

If the traffic is found 2110 to either originate from or be directed to a container or other computing device that is not part of the clone application. For example, if a packet is transmitted by a container 1320*a*, 1320*b* of the clone application and has a destination address that is not the address of another container 1320*a* 1320*b* of the clone application (either parent or clone address), then the packet may be determined not to be intra-bundle traffic. In some instances, the clone application and parent application may be constrained to not transmit traffic to one another. In other instances, this simply does not occur since the clone and parent applications are never configured to communicate with one another.

In that case, traffic may be translated 2114. In particular, packets outbound from a container 1320*a*, 1320*b* may be translated to replace references to the parent address for the container with the clone address for the container. In this manner, return traffic can be routed to the clone container rather than to the corresponding container of the parent application.

In a like manner, inbound traffic addressed to the clone address of a clone container may be translated to include the parent address of the clone container and transmitted to the clone container.

Figure 22:
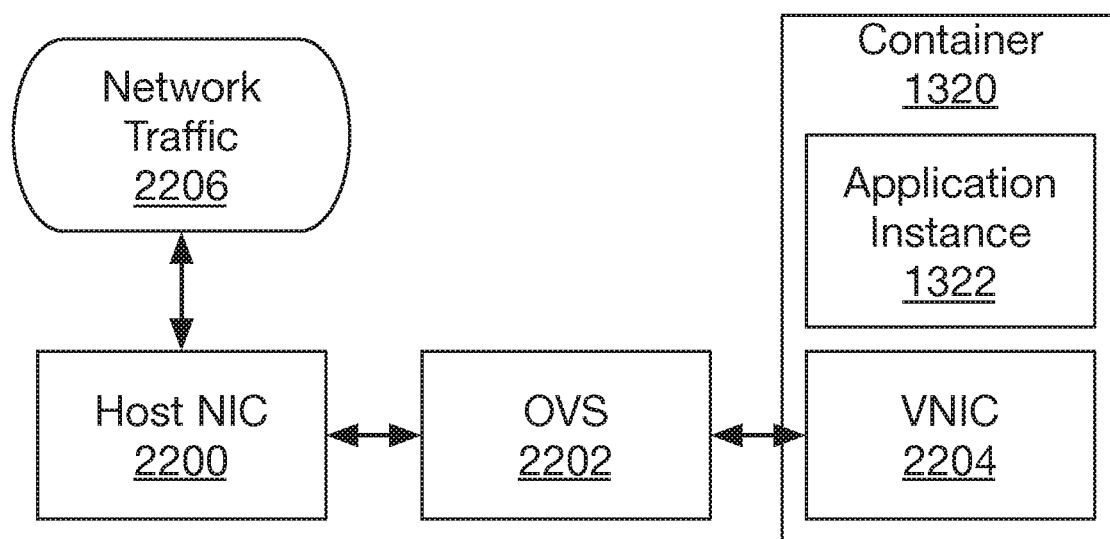
FIG. 22 is a schematic diagram of components for processing traffic in a bundled application in accordance with an embodiment of the present invention.

FIG. 22 illustrates an approach for virtualized network communication that may be used to implement the NAT approach described above with respect to FIG. 21. A host computing device, such as a storage node 106 or compute node 110 may include a host network interface controller (NIC) 2200. The NIC 2200 may perform network communication and may have a static or dynamic IP address assigned to it. Accordingly, packets may be addressed to the host computing device using that IP address. The host NIC 2200 may be associated with an open virtual switch (OVS 2202). The OVS 2202 may perform NAT in order to route packets to the correct container and to ensure that outbound packets use the clone addresses rather than the parent addresses. Example approaches for performing this are described below with respect to FIGS. 23 through 29.

Figure 23:
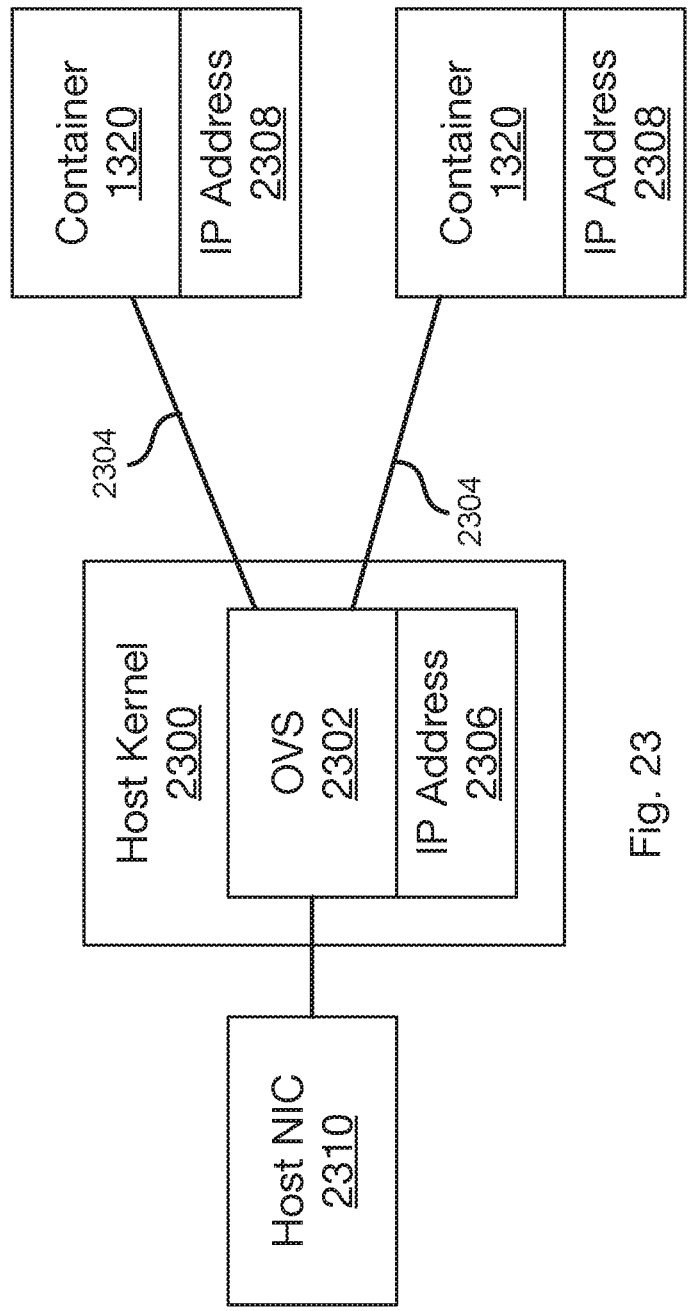
FIG. 23 is a diagram illustrating components for implementing addresses for containers of a bundled application in accordance with an embodiment of the present invention.

Referring to FIG. 23, in some embodiments, addressing of containers 1320 of a bundled application may be implemented on a node (compute node 110 or hybrid node) using the illustrated configuration. In particular, a kernel 2300 of the node may implement an Open Virtual Switch (OVS) 2302 that is connected to containers 1320 on the node by means of pipes 2304. The OVS 2302 is assigned the IP address 2306 of the node and the containers 1320 are assigned addresses 2308, which may be externally routable IP addresses. The OVS 2302 may therefore be programmed to route packets including an IP addresses 2308 to the container 1320 assigned that IP address 2308. The OVS 2302 may be coupled to the host NIC (network interface controller) 2310 by a pipe and communicate with a network by way of the host NIC 2310.

In this manner, containers 1320 may be assigned externally routable IP addresses and therefore may be portable. In particular, a container may be moved to a different node and still be addressable by the same address by way of the OVS 2302 on the new node.

Figure 24:
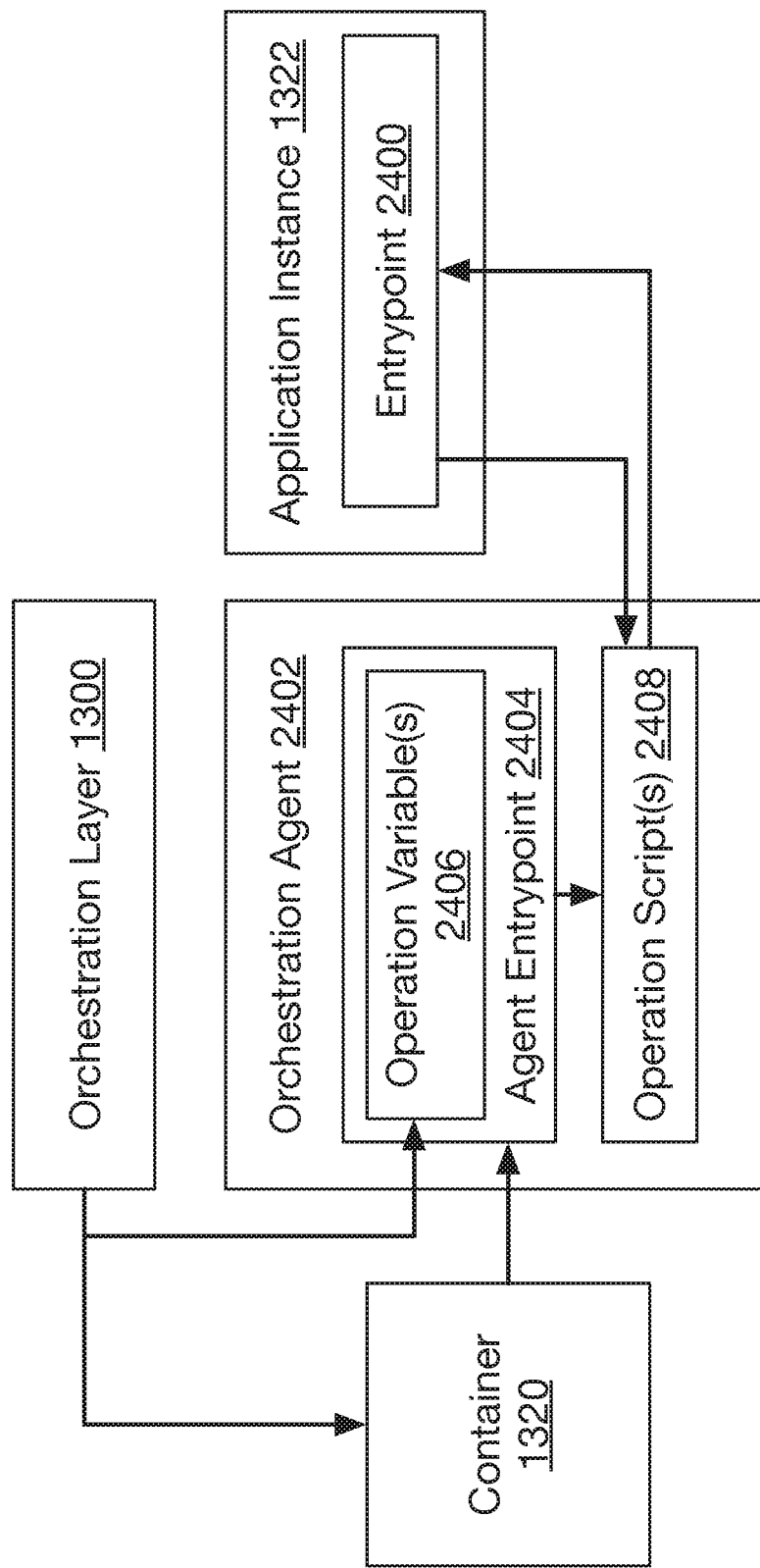
FIG. 24 is a diagram illustrating components for implementing an entrypoint to an application instance in accordance with an embodiment of the present invention.

Referring to FIG. 24, an application instance 1322 may implement an entrypoint 2400. As known in the art, an entrypoint may be a point in an executable file that is executed first when that file is executed. Accordingly, the entrypoint 2400 is programmed by a developer of the application and is exposed for use by an executing host system. In a like manner, each container 1320 is programmed to host execution of an application instance 1322 and is programmed to invoke the entrypoint of the application instance 3122 it is hosting.

In some embodiments, an orchestration agent 2402 executes on a node executing one or more containers 1320 and corresponding application instances 1322 of a bundled application 1302 ("the subject node"). The orchestration agent 2402 may implement an agent entrypoint 2404 and modify the container 1320 to refer to the agent entrypoint 2404. For example, prior to starting execution of the container 1320, an executable image of the container 1320 may be modified to refer to the agent entrypoint 2404 rather than to the entrypoint 2400 of the application instance 1322. Alternatively, modification to refer to the agent entrypoint 2404 may be performed after starting execution of the container 1320 but prior to invoking of the entrypoint 2400 of the application instance 1322.

The orchestration layer 1300 may provide the agent entrypoint 2404 with one or more operation variables 2406 that instruct the agent entrypoint 2404 as to what operation is being performed. Actions may include initial creation, starting, stopping, restarting, cloning, moving, rolling back or other actions performed with respect to a container 1320. The agent entrypoint 2404 may define executable code that processes one or more operation variables 2406 and performs actions corresponding to the one or more operation variables. In some embodiments, the orchestration agent 2402 may host or access operation scripts 2408. For example, for a given operation variable 2406, the agent entrypoint may execute an operation script 2408 corresponding to that operation variable. The scripts 2408 may be stored locally on the subject node or accessed from a remote repository.

The scripts 2408 and/or agent entrypoint 2404 may include executable code that invokes the entrypoint 2400 of the application instance 1322. In this manner, the orchestration layer 1300 may execute one or more actions prior to starting an application instance 1322 in order to implement customized actions, such as hooks 1310 specified by a developer as part of creation, starting, restarting, snapshotting, moving, cloning, rolling back, or any of the other actions described herein as being performed with respect to a bundled application 1302.

Figure 25:
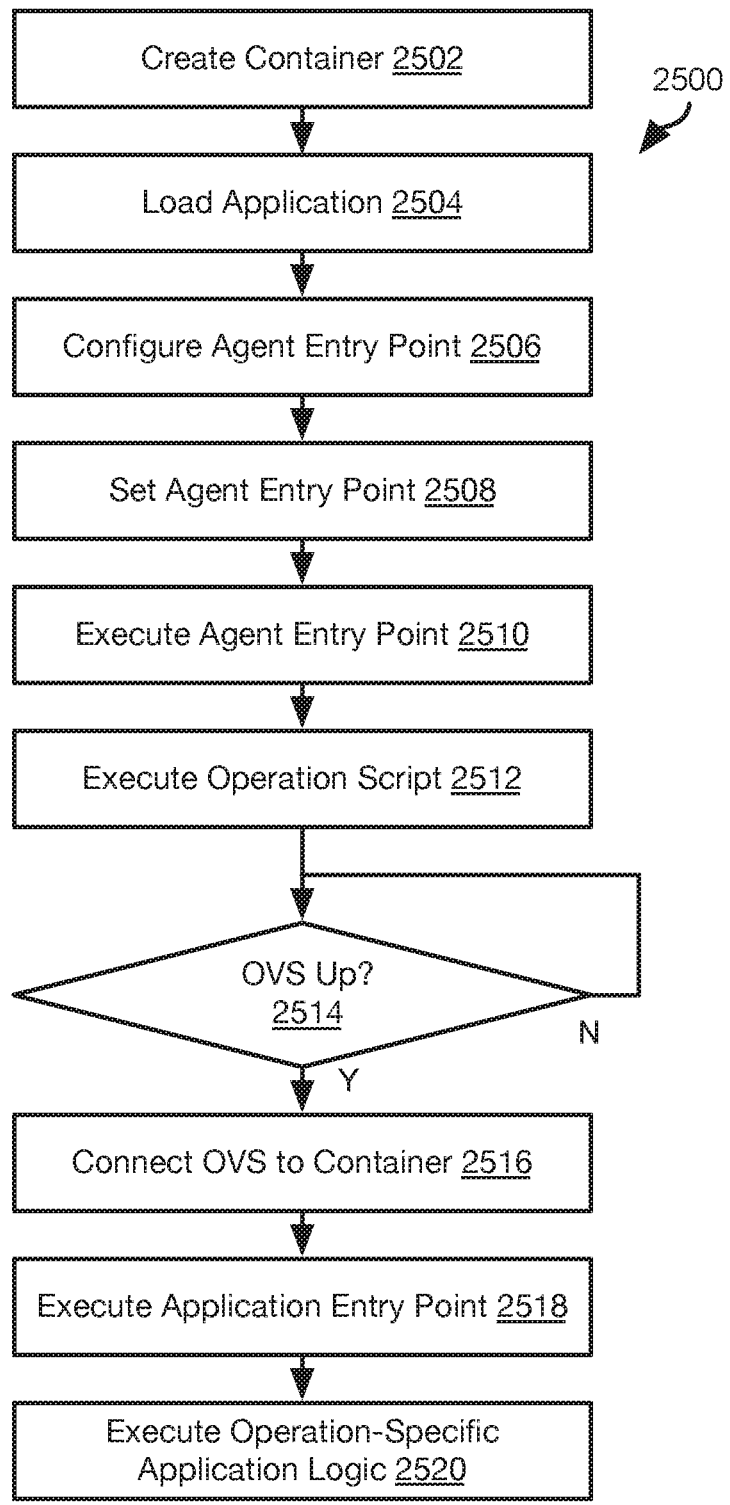
FIG. 25 is a process flow diagram of a method for implementing an entrypoint to an application instance in accordance with an embodiment of the present invention.

FIG. 25 illustrates a method 2500 for using an agent entrypoint 2404 to facilitate use of a container in combination with an OVS 2302 (see FIG. 23).

The method 2500 may include creating 2502 a container 1320 on the subject node and loading 2504 an application instance 1322 into the container. This may include loading a single image that includes an image of the container 1320 pre-loaded with the image of the application instance 1322. Steps 2502 and 2504 may be invoked by the orchestration layer as part of deployment, cloning, moving or other actions performed with respect to a container 1320 of a bundled application 1302. Were the container 1320 is a DOCKER container, step 2502 may include creating 2502 the container with the parameter "net=none" such that the container 1320 does not attempt to connect to a DOCKER bridge. Instead, the container 1320 may be connected to an OVS 2302 as described below.

The method 2500 may further include configuring 2506 the agent entrypoint 2404. In particular, executable code or instructions from the orchestration layer 1300 may be transmitted from the orchestration layer 1300 to the orchestration agent 2402 on the subject node, where this executable code or instructions includes the executable for the agent entrypoint 2404 and one or more operation variables 2406 or just the one or more operation variables 2406. In the latter case, the orchestration agent 2402 may configure a pre-loaded agent entrypoint 2404 to include the one or more operation variables 2406.

The method 2500 may further include setting 2508 the agent entry point 2404 as the entrypoint for the application instance 1322 in the container 1320. As noted above, this may be performed before or after starting execution of the container 1320 and may be performed by the orchestration agent 2402.

The container 1320 may then execute 2510 the agent entrypoint 2404. In particular, when it starts execution, the container 1320 finds an entrypoint of a loaded application and executes it. Accordingly, this function will result in execution of the agent entrypoint 2404 due to the modification of step 2508.

In some embodiments, the agent entrypoint 2404 may then execute 2512 an operation script 2408, such as the operation script 2408 referred to by the one or more operation variables 2406 set at step 2506.

In the illustrated example, the operation script includes instructions to enable the establishment of a connection to an OVS 2302 (see FIG. 23). For example, the operation script 2408 may instruct the agent entrypoint 2404 to wait until the OVS is found 2514 up and executing. The operation script 2408 may then invoke connecting 2516 of the container 1320 to the OVS 2302 and the host NIC 2310 through the OVS 2302. Once a connection to the OVS 2302 and to the host NIC 2310 is established through the OVS 2302, the method 2500 may include invoking, by the agent entrypoint 2404, execution 2518 of the entrypoint 2400 of the application instance 1322, either with or without executing any other preparatory actions specified in the operation script 2408.

In some embodiments, a script may also be executed by the application instance 1322 that is specific to the operation specified by the one or more operation variables 2406. For example, the agent entrypoint 2404 or orchestration layer 1300 may pass an argument to the application instance 1322, such as upon invoking the application entrypoint 2400. This argument may be an operation variable 2406 or a reference to a script or other file. The application instance 1322 may then execute 2520 this script or file in order to implement a particular operation. For example, the script or file may be a post-action hook 1310 provided by a developer for the application instance to be performed following a particular action (create, start, clone, move, rollback, etc.).

Note that steps 2514-2516 are particular to the case where an OVS 2302 is used to connect to a container and may be omitted in cases where other connection approaches are used. Accordingly, the illustrated approach for implementing entrypoints may be used in a general case that is not specific to use with an OVS 2302.

Figure 26:
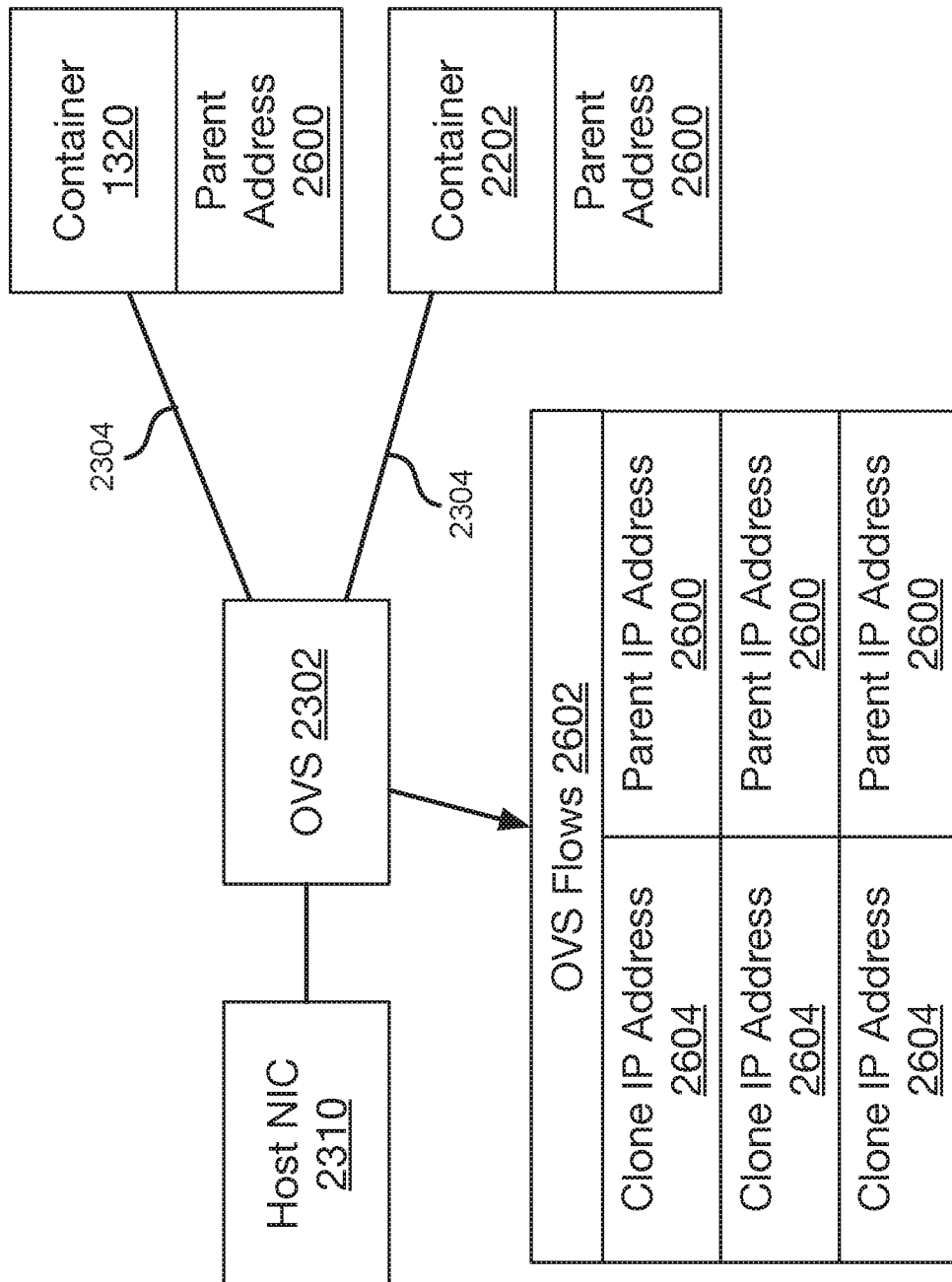
FIG. 26 is a diagram illustrating implementation of a fenced clone in accordance with an embodiment of the present invention.

FIG. 26 illustrates an approach for implementing a fenced clone (see FIGS. 20-22) using an OVS 2302. In the illustrated approach, containers 1320 of a clone application are assigned the IP addresses 2600 of the corresponding container 1320 of the parent application.

The OVS 2302 implements flows 2602 using a mapping between the parent addresses 2600 and the clone addresses 2604. In particular, a particular container 1320 in the parent bundled application 1320 and the corresponding clone of that container 1320 may be assigned the same IP address 1320. The clone container is also assigned a clone IP address that is unique to the clone container. A mapping in the flow 2602 therefore maps the parent IP address to the clone IP address. This mapping may be received by the OVS 2302 from the orchestration layer 1300, which may, for example, assign the clone IP addresses as part of the cloning process and maintain a mapping between the clone IP addresses and the parent IP addresses.

Figure 27:
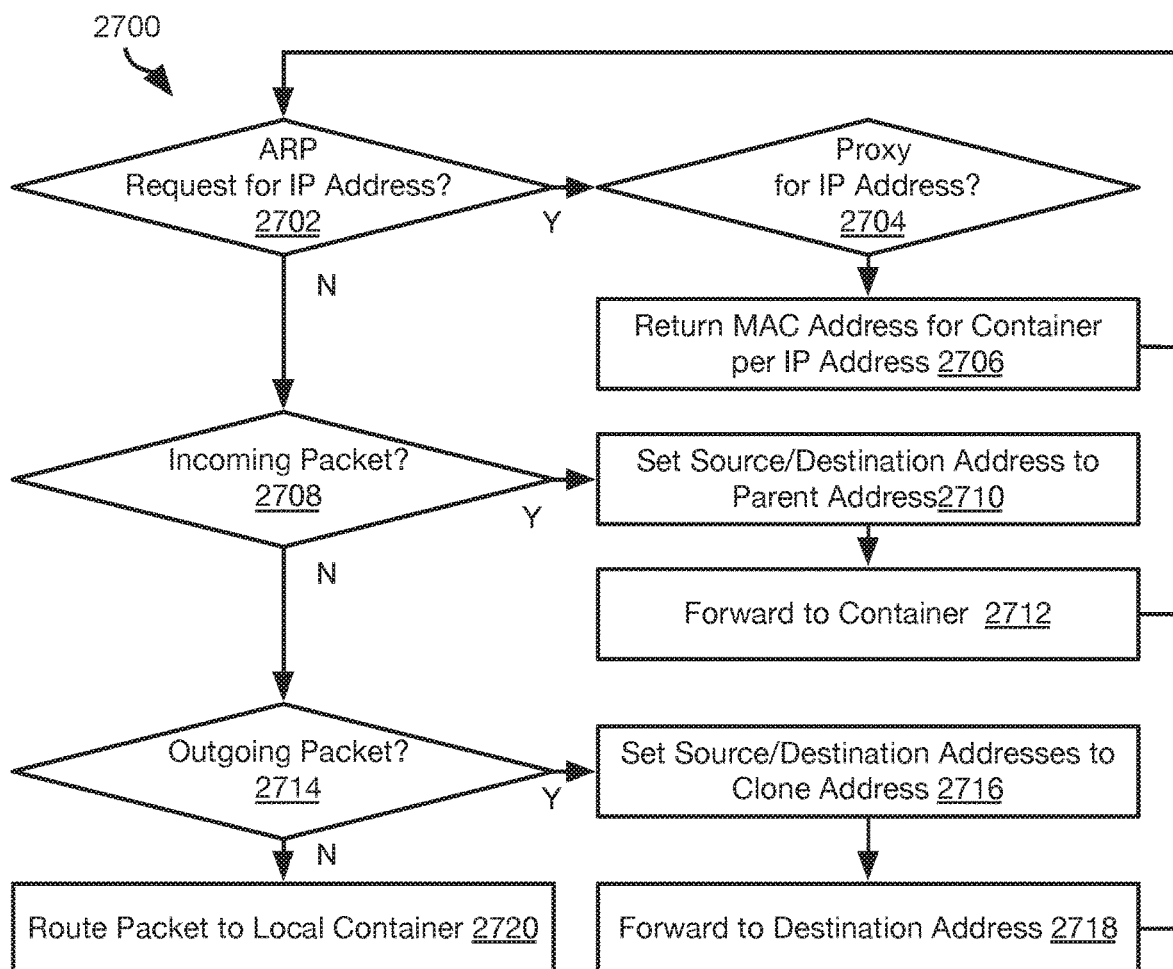
FIG. 27 is a process flow diagram of a method for implementing a fenced clone in accordance with an embodiment of the present invention.

FIG. 27 illustrates a method 2700 for implementing a fenced clone using the approach illustrated in FIG. 26. The method 2700 may be executed by the OVS 2302 on the subject node.

The method 2700 may include detecting receipt 2702 of ARP (address resolution protocol) requests. The OVS 2302 may be configured, such as by the orchestration layer 1300, as a proxy for the clone IP addresses 2604 and include a mapping of MAC (machine access code) addresses to IP addresses for containers connected to the OVS 2302. Accordingly, if an ARP request is received by the OVS 2302 and found 2704 to include an IP address for which the OVS 2302 is a proxy, the OVS 2302 will return 2706 the MAC address for the container 1320 assigned that IP address.

For example, if the ARP request includes the clone IP address 2604 of a container 1320, the OVS 2302 may return a MAC (machine access code) address for that container 1320. The OVS 2302 may be configured to send a proxy ARP only for an IP address that is not actually plumbed to an interface, e.g., the host NIC 2310. Since the parent IP address 2600 is plumbed to an interface in some embodiments, there is no need to have a proxy ARP for that. The clone IP address 2604 is not plumbed to any interface and therefore the OVS 2302 sends the proxy ARP for the clone IP address 2604 in some embodiments. However, if both parent container 1320 and corresponding clone container 1320 are on the same node, the OVS 2302 may readily be configured to return the MAC address for the clone container 1320 in response to an ARP for the clone IP address and return the MAC address for the parent container 1320 in response to an ARP for the parent IP address.

The method 2700 may include detecting 2708 incoming packets, i.e. packets received from a network. If the packets include a clone IP address 2604 for a clone container 1320, these addresses are replaced 2710 with the corresponding parent IP address as specified in the flows 2602 and the packet is forwarded 2712 over the pipe 2304 to the container 1320 assigned the corresponding parent IP address.

In particular, if either of the source or destination IP addresses in the packet include a clone IP address 2604 for the cloned application, these IP addresses will be replaced with their corresponding parent IP addresses. Accordingly, if a clone container A on a remote node communicates with clone container B on the subject node, the packet following step 2710 will include the IP address of the parent container for container A as the source address and the IP address of the parent container for container B as the destination address. In this manner, traffic external to the node is routed using the unique clone addresses and avoids conflict with traffic for the parent application. However, upon reaching the clone containers 1320, the traffic includes the parent IP addresses and therefore is consistent with any persistent references to the parent IP addresses.

In a like manner, if an outgoing packet is detected 2714 by the OVS 2302 to include a parent IP address 2600 as either the source or destination, each parent IP address 2600 is replaced 2716 with its corresponding clone address 2604 and forwarded 2718 to the destination address following step 2716, which may be a clone address 2604 or the original destination address if it was not one of the parent IP addresses 2600 mapped in the flow 2602.

If a packet is neither incoming nor outgoing, i.e. it is local traffic between containers 1320 on the subject node, the packet is routed 2720 by the OVS 2302 accordingly. In particular, the packet is sent to the clone container 1320 referenced by the parent IP address set as the destination of the packet.

Figure 28:
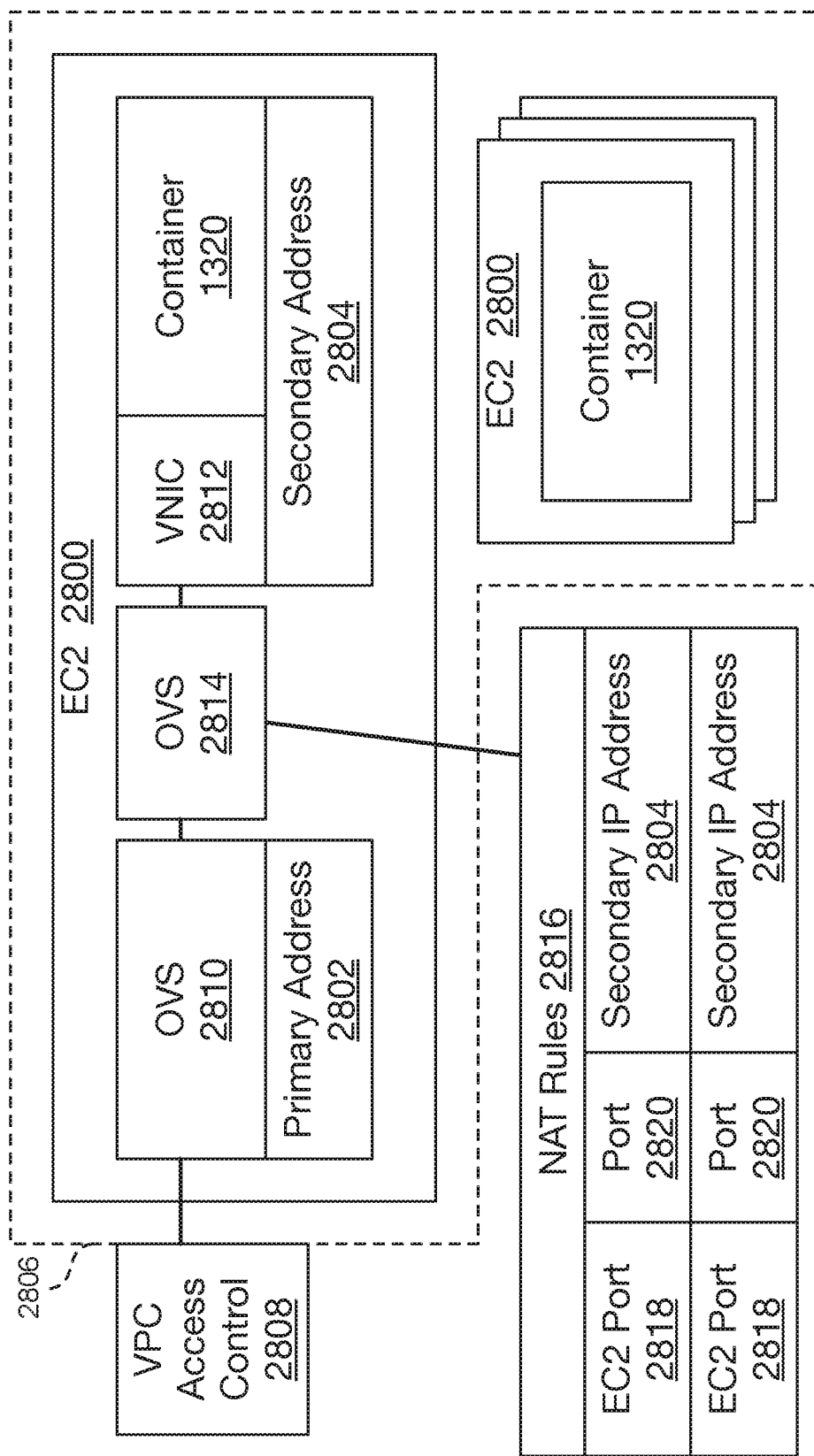
FIG. 28 is a diagram illustrating implementation of a fenced clone in a cloud computing environment in accordance with an embodiment of the present invention.

FIG. 28 illustrates an approach for implementing addressing of containers 1320 in a cloud computing environment, such as using virtual computing nodes in a cloud computing system. Virtual computing nodes may be embodied as EC2 (Elastic Compute Cloud) nodes 2800 implemented by AWS (AMAZON Web Services).

As known in the art an EC2 2800 may be assigned a primary IP address 2802 and a secondary IP addresses 2804. As also known in the art, EC2 nodes 2800 may be associated with a virtual private circuit VPC 2806 such that communication among EC2 nodes 2800 of the VPC 2806 may be performed using either address 2802, 2804. However, VPC access controls 2808 only permit communication outside of the VPC 2806 using the primary addresses 2802 for the EC2 nodes 2800.

In some implementations, an EC2 2800 may implement an OVS 2810 that is assigned the primary address 2802 of the EC2. Accordingly, communication using the primary address 2802 may be performed through the OVS 2810.

In the illustrated embodiment, the container 1320 may implement a VNIC (virtual network interface controller) 2812 that is connected to a second OVS 2814, such as by means of a pipe. The OVS 2814 may implement one or more NAT rules 2816 that map a port 2618 of the primary address 2802 to a port 2820 of the secondary address 2804. As shown, the OVS 2814 may be coupled to the OVS 2810. In some embodiments, the OVS 2814 is implemented as a DOCKER bridge.

Traffic sent from the secondary address 2804 may therefore be mapped by the OVS 2814 to a particular port 2818 of the primary address 2802 in the NAT rules 2816 and routed externally from the VPC 2806 using the primary address 2802 as the source address. Return traffic addressed to a port 2818 the primary address 2802 may then be translated back to the corresponding port port 2820 of the secondary IP address 2804 using the NAT rules 2816. The translated traffic may then be routed by the OVS 2814 to that port 2820 of the secondary IP address mapped to the port 2818 in the return traffic.

Figure 29:
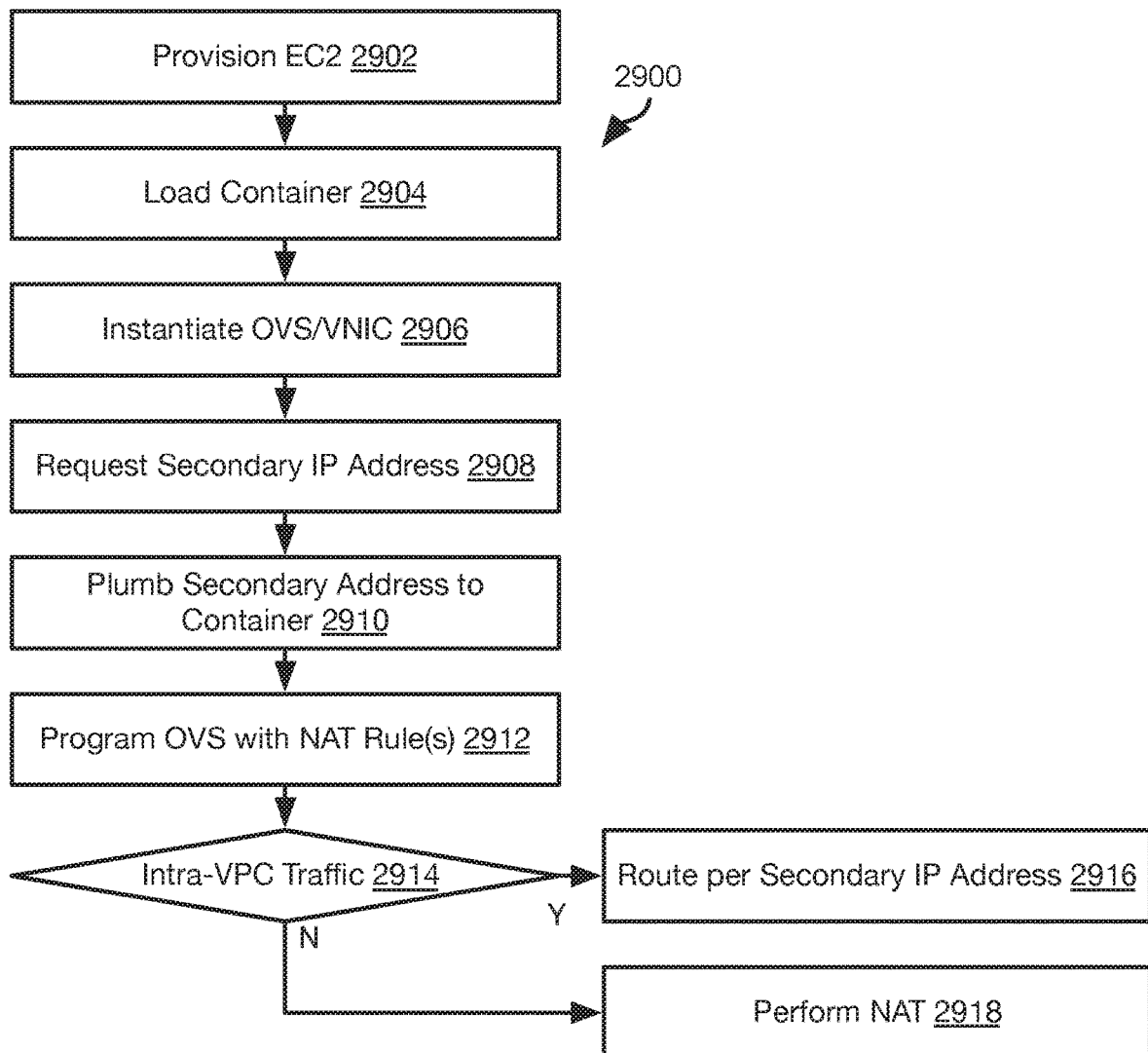
FIG. 29 is a process flow diagram of a method for implementing a fenced clone in a cloud computing environment in accordance with an embodiment of the present invention.

FIG. 29 illustrates a method 2900 for performing network communication using the approach shown in FIG. 28.

The method 2900 may include provisioning 2902 an EC2 2800 in AWS. For example, the orchestration layer 1300 may request provisioning of the EC2 2800 from AWS for use by a bundled application 1300.

The method 2900 may further include the orchestration layer 1300 loading 2904 a container 1320 into the EC2 and instantiating an additional OVS 2814 for the container 1320. In some instances, an EC2 will implement an OVS 2810 by default. In others, both OVS 2810 and 2814 are instantiated by a user of the EC2, which is the orchestration layer 1300 in some embodiments. In some embodiments, step 2906 further includes instantiating a VNIC for the container 1320 (see, e.g., description of FIG. 22).

In some embodiments, the application instance 1322 and container 1320 hosting it may be configured by the orchestration layer 1300 to use one or both of the OVSs 2810, 2814 using the approach for implementing entrypoints described above with respect to FIGS. 24 and 25.

The method 2900 may further include requesting 2908, by the orchestration layer 1300, assignment of a secondary IP address 2804 to the container 1320 loaded at step 2904 and plumbing 2910 the secondary address to the container 1320. The secondary IP address 2804 may be selected based on its use. For example, some applications require two IP addresses to function. Accordingly, an available secondary IP address 2804 may be selected and assigned at step 2908.

In another use case, the secondary IP address 2804 may be selected by the orchestration layer 1300, to be the parent IP address of the parent container 1320 of the container loaded at step 2904. In this use case, the primary address 2802 of the EC2 provisioned at step 2902 may be selected to be the clone IP address In another use case, the secondary IP address 2804 may be used as a portable IP address that can be moved along with the container 1320 if needed. Accordingly, the secondary IP address 2804 may be assigned by the orchestration layer 1300 and reassigned if the container 1320 is moved to a different location (see discussion of FIG. 23).

The method 2900 may further include programming 2912 the OVS 2814 with one or more NAT rules with respect to the secondary IP address 2804. The NAT rules may make use of port numbers to route traffic to the secondary IP address 2804. For example, traffic from the secondary IP address 2804 may be assigned an otherwise unused port number for the primary IP address 2802. Traffic from the container 1320 having a source set to the secondary IP address 2804 may be modified to replace the secondary IP address 2804 with the primary IP address 2802 and replace the port number 2820 to a port number 2818 of the primary IP address 2802. Inbound traffic including that port number 2818 from another EC2, another container 1320, or another computing device may then be modified to change the destination address from the primary IP address 2802 to the secondary IP address 2804 and possibly to include the port 2820 of the secondary IP address 2804 corresponding to that port number 2818 in the NAT rules 2816.

In particular, ports of the secondary IP address 2804 may be implemented. For example, port A1 of the secondary IP address 2804 may be mapped to port P1 of the primary IP address 2802 and port A2 of the secondary IP address 2804 may be mapped to port P2 of the primary IP address 2802. Any number of ports of the secondary IP address may be assigned to unique ports to enable addressing of specific ports of the container 1320, such as ports assigned to particular network services.

The container 1320 and the application instance 1322 hosted by it may then commence operation and transmit and receive traffic from various other entities. If traffic is found 2914 by the OVS 2814 to be sent to or received from another EC2 2800 in the same VPC, then the traffic is routed 2916 according to the secondary IP addresses 2804, i.e. the OVS 2814 will route the traffic to the EC2 2800 and container 1320 to which the secondary IP address 2804 in the destination field of the traffic is assigned.

If traffic is found 2914 to be sent to or received from an entity outside of the VPC including the OVS 2814, the OVS 2814 may perform 2918 NAT. As described above, references to a secondary address 2804 in outbound traffic may be replaced with the primary address 2802 and a port assigned to that secondary address 2804 (and possibly the specific port of the secondary address 2804 referenced in the outbound traffic). The modified traffic may then be transmitted to the destination specified in the outbound traffic For inbound traffic, references to a first port number assigned to a secondary address 2804 may cause the OVS 2814 to replace the primary IP address 2802 with the secondary address 2804 mapped to that port. Likewise, the first port number may be replaced with a second port number of the secondary address 2804 mapped to the first port number. The modified traffic may then be forwarded by the OVS 2814 to the container 1320 assigned the secondary IP address 2804.

Figure 30:
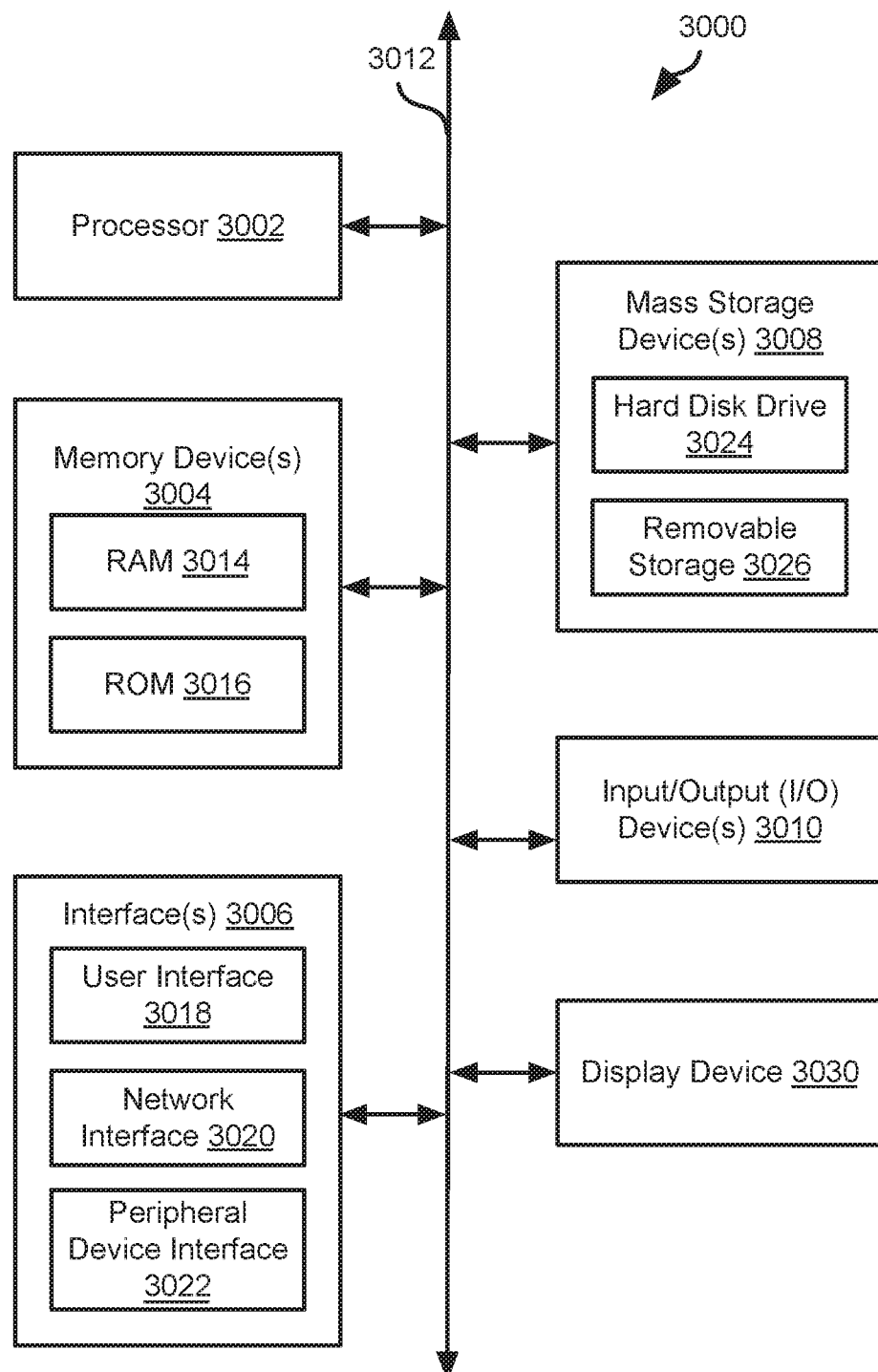
FIG. 30 is a schematic block diagram of an example computing device suitable for implementing methods in accordance with embodiments of the invention.

FIG. 30 is a block diagram illustrating an example computing device 3000. Computing device 3000 may be used to perform various procedures, such as those discussed herein. The storage manager 102, storage nodes 106, compute nodes 110, and hybrid nodes, may have some or all of the attributes of the computing device 3000.

Computing device 3000 includes one or more processor(s) 3002, one or more memory device(s) 3004, one or more interface(s) 3006, one or more mass storage device(s) 3008, one or more Input/output (I/O) device(s) 3010, and a display device 3030 all of which are coupled to a bus 3012. Processor(s) 3002 include one or more processors or controllers that execute instructions stored in memory device(s) 3004 and/or mass storage device(s) 3008. Processor(s) 3002 may also include various types of computer-readable media, such as cache memory.

Memory device(s) 3004 include various computer-readable media, such as volatile memory (e.g., random access memory (RAM) 3014) and/or nonvolatile memory (e.g., read-only memory (ROM) 3016). Memory device(s) 3004 may also include rewritable ROM, such as Flash memory.

Mass storage device(s) 3008 include various computer readable media, such as magnetic tapes, magnetic disks, optical disks, solid-state memory (e.g., Flash memory), and so forth. As shown in FIG. 30, a particular mass storage device is a hard disk drive 3024. Various drives may also be included in mass storage device(s) 3008 to enable reading from and/or writing to the various computer readable media. Mass storage device(s) 3008 include removable media 3026 and/or non-removable media.

I/O device(s) 3010 include various devices that allow data and/or other information to be input to or retrieved from computing device 3000. Example I/O device(s) 3010 include cursor control devices, keyboards, keypads, microphones, monitors or other display devices, speakers, printers, network interface cards, modems, lenses, CCDs or other image capture devices, and the like.

Display device 3030 includes any type of device capable of displaying information to one or more users of computing device 3000. Examples of display device 3030 include a monitor, display terminal, video projection device, and the like.

Interface(s) 3006 include various interfaces that allow computing device 3000 to interact with other systems, devices, or computing environments. Example interface(s) 3006 include any number of different network interfaces 3020, such as interfaces to local area networks (LANs), wide area networks (WANs), wireless networks, and the Internet. Other interface(s) include user interface 3018 and peripheral device interface 3022. The interface(s) 3006 may also include one or more peripheral interfaces such as interfaces for printers, pointing devices (mice, track pad, etc.), keyboards, and the like.

Bus 3012 allows processor(s) 3002, memory device(s) 3004, interface(s) 3006, mass storage device(s) 3008, I/O device(s) 3010, and display device 3030 to communicate with one another, as well as other devices or components coupled to bus 3012. Bus 3012 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 3000, and are executed by processor(s) 3002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
providing a first computing device including one or more processing devices and one or more memory devices operably coupled to the one or more processing devices;
executing, by the first computing device, an agent;
loading, by the first computing device, a container;
loading, by the first computing device, an application instance for execution in the container, the application instance defining an application entrypoint;
modifying, by the agent, the container to reference an agent entrypoint referencing the agent instead of the application entrypoint prior to invoking the application entrypoint such that the container is loaded with the application instance but the container does not reference the entrypoint of the application instance; and
executing by the container, the agent entrypoint to perform one or more actions prior to invoking the application entrypoint;
further executing the agent entrypoint after performing the one or more actions to invoke execution of the application entrypoint within the container;
implementing, by the first computing device, a virtual switch on the first computing device;

wherein executing by the container, the agent entrypoint comprises:
  establishing a connection to the virtual switch; and
  waiting to execute the application entrypoint until the connection to the virtual switch is established.

2. The method of claim 1, wherein executing, by the container, the agent entrypoint comprises:
  executing, by the container, a file referenced by the agent entrypoint.

3. The method of claim 2, further comprising:
  receiving, by the agent, an operation instruction; and
  setting, by the agent, an operation variable in the agent entrypoint corresponding to the operation instruction;
  wherein executing, by the container, the file referenced by the agent entrypoint comprises executing a file corresponding to the operation variable.

4. The method of claim 3, further comprising:
  passing, by the agent entrypoint, an argument to the application entrypoint, the argument corresponding to the operation instruction;
  processing, by the application instance, the argument by executing a set of application functions corresponding to the operation instruction.

5. The method of claim 3, wherein the operation instruction includes an instruction to at least one of:
  create the container; and
  start the container.

6. The method of claim 5, wherein the operation instruction includes an instruction to at least one of:
  restart the container;
  clone the container; and
  move the container.

7. The method of claim 3, wherein the container is one of a plurality of containers of a bundled application, the method further comprising:
  deploying, by an orchestration layer, the plurality of containers in a distributed computing system including the first computing device, wherein deploying the bundled application includes transmitting the operation instruction to the agent.

8. The method of claim 1, wherein the container has a first container address and a second container address assigned thereto, the method further comprising:
  receiving, by the virtual switch, first packets from the container; and
  (a) changing, by the virtual switch, a source address in the first packets from the first container address of the container to the second container address of the container;
  (b) changing, by the virtual switch, a destination address in the first packets from a first container address of a target container of the first packets to a second container address of the target container of the first packets; and
  transmitting, by the virtual switch, the first packets as modified according to (a) and (b) over a network.

9. The method of claim 8, further comprising, by the first computing device:
  receiving, by the virtual switch, second packets from the network; and
  (c) changing, by the virtual switch of the first computing device, a source address in the second packets from a second container address of a source container of the second packets to a first container address of the source container of the second packets;
  (d) changing, by the virtual switch, a destination address in the second packets from the second container address of the container to the first container address of the container; and
  transmitting, by the virtual switch, the first packets as modified according to (c) and (d) to the container.

10. A system comprising:
  a first computing device including one or more processing devices and one or more memory devices operably coupled to the one or more processing devices, the one or more memory devices storing executable code effective to cause the one or more processing devices to:
  execute an agent;
  load a container;
  load an application instance for execution in the container, the application instance defining an application entrypoint;
  modify the container to reference an agent entrypoint referencing the agent instead of the application entrypoint prior to invoking the application entrypoint; and
  execute the agent entrypoint to perform one or more actions prior to invoking the application entrypoint;
  further executing the agent entrypoint after performing the one or more actions to invoke execution of the application entrypoint by the container;
  wherein the executable code is further effective to cause the one or more processing devices to:
  implement a virtual switch on the first computing device; and
  execute, by the container, the agent entrypoint by:
    establishing a connection to the virtual switch; and
    waiting to execute the application entrypoint until the connection to the virtual switch is established.

11. The system of claim 10, wherein the agent entrypoint is further operable to cause the container to execute a file referenced by the agent entrypoint.

12. The system of claim 11, wherein the agent is further programmed to:
  receive an operation instruction; and
  set an operation variable in the agent entrypoint corresponding to the operation instruction;
  wherein the agent entrypoint is further operable to cause the container to execute a file corresponding to the operation variable.

13. The system of claim 12, wherein the agent entrypoint is further programmed to pass an argument to the application entrypoint, the argument corresponding to the operation instruction; and
  wherein the application instance is programmed to process the argument by executing a set of application functions corresponding to the operation instruction.

14. The system of claim 12, wherein the operation instruction includes an instruction to at least one of:
  create the container; and
  start the container.

15. The system of claim 14, wherein the operation instruction includes an instruction to at least one of:
  restart the container;
  clone the container; and
  move the container.

16. The system of claim 12, further comprising an orchestration computing device, the orchestration computing device programmed to:
  deploy a plurality of containers of a bundled application on a plurality of computing devices including the first computing device; and transmit the operation instruction to the agent on the first computing device.

17. The system of claim 10, wherein the container has a first container address and a second container address assigned thereto;

wherein the executable code is further effective to cause the one or more processing devices to:

receive, by the virtual switch, first packets from the container; and (a) change, by the virtual switch, a source address in the first packets from the first container address of the container to the second container address of the container;

(b) change, by the virtual switch, a destination address in the first packets from a first container address of a target container of the first packets to a second container address of the target container of the first packets; and transmit, by the virtual switch, the first packets as modified according to (a) and (b) over a network.

18. The system of claim 17, wherein the executable code is further effective to cause the one or more processing devices to:

receive, by the virtual switch, second packets from the network; and (c) change, by the virtual switch of the first computing device, a source address in the second packets from a second container address of a source container of the second packets to a first container address of the source container of the second packets;

(d) change, by the virtual switch, a destination address in the second packets from the second container address of the container to the first container address of the container; and transmit, by the virtual switch, the first packets as modified according to (c) and (d) to the container.

* * * * *